United States Patent
Nicole et al.

(10) Patent No.: US 11,998,904 B2
(45) Date of Patent: *Jun. 4, 2024

(54) FLUIDIZED BED REACTORS FOR POST-PROCESSING POWDERED CARBON

(71) Applicant: Lyten, Inc., San Jose, CA (US)

(72) Inventors: Jacques F. Nicole, Palo Alto, CA (US); Pawel A. Piotrowicz, Santa Clara, CA (US); Michael W. Stowell, Sunnyvale, CA (US)

(73) Assignee: Lyten, Inc., San Jose, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/875,173

(22) Filed: Jul. 27, 2022

(65) Prior Publication Data
US 2023/0356167 A1    Nov. 9, 2023

Related U.S. Application Data

(63) Continuation of application No. 17/739,397, filed on May 9, 2022, now Pat. No. 11,433,369.

(51) Int. Cl.
*B01J 8/42* (2006.01)
*B01J 4/00* (2006.01)
(Continued)

(52) U.S. Cl.
CPC .............. *B01J 8/42* (2013.01); *B01J 4/007* (2013.01); *B01J 8/1809* (2013.01); *B01J 8/1827* (2013.01); *C01B 32/05* (2017.08); *B01J 2204/002* (2013.01); *B01J 2208/00539* (2013.01); *B01J 2208/00893* (2013.01); *C01P 2004/34* (2013.01); *C01P 2004/64* (2013.01)

(58) Field of Classification Search
CPC . B01J 8/42; B01J 8/1809; B01J 8/1827; B01J 2204/002; C01B 32/05; C01P 2004/34; C01P 2004/64
See application file for complete search history.

(56) References Cited

U.S. PATENT DOCUMENTS 5,620,743 A    4/1997  Harth et al.
9,767,992 B1   9/2017  Stowell et al.

FOREIGN PATENT DOCUMENTS

WO    2016/012367 A1    1/2016

OTHER PUBLICATIONS

International Search Report and Written Opinion dated Aug. 31, 2023, issued in PCT Appl. No. PCT/US2023/021130; 12 pages.

(Continued)

*Primary Examiner* — Lessanework Seifu
(74) *Attorney, Agent, or Firm* — Paradice & Li LLP

(57) ABSTRACT

A system for post-processing carbon powders includes a fluidized-bed reactor having an interior containing a fluidized-bed region. The system may include a gas feed source, a gas inlet value, a gas-solid separator, and an energy source coupled to the fluidized-bed reactor. Carbon nano-particulates may be loaded, in powder form, into the fluidized-bed region prior to operation. The gas feed source may output a gas-phase mixture into the interior of the fluidized-bed reactor, and the energy source may electromagnetically excite the gas-phase mixture and generate a plasma-phase mixture formed in a plasma region positioned adjacent to or within the interior of the fluidized-bed reactor. The energy source may be positioned at one or more positions relative to the gas inlet valve.

20 Claims, 20 Drawing Sheets

(51) Int. Cl.
    *B01J 8/18*           (2006.01)
    *C01B 32/05*        (2017.01)

(56)           References Cited

OTHER PUBLICATIONS

Heintze, M. et al., "Surface functionalisation of carbon nano-fibres in fluidised bed plasma", Surface and Coatings Technology, vol. 174-175 (2003), pp. 831-834.
Du, Changming et al., "Plasma Fluidized Bed", Advanced Topics in Science and Technology in China; https://doi.org/10.1007/978-981-10-5819-6; copyright Springer Nature Singapore Pte Ltd. and Zhejiang University Press; 2018; 145 pages.
Sathiyamoorthy, D., "Plasma spouted/fluidized bed for materials processing"; 23rd National Symposium on Plasma Science & Technology (PLASMA-2008); Journal of Physics: Conference Series, vol. 208; IOP Publishing; 2010; 15 pages.

FLUIDIZED BED REACTORS FOR POST-PROCESSING POWDERED CARBON

CROSS-REFERENCE TO RELATED APPLICATION

This Patent Application is a continuation of, and claims priority to, U.S. patent application Ser. No. 17/739,397 entitled "FLUIDIZED BED REACTORS FOR POST-PROCESSING POWDERED CARBON" and filed on May 9, 2022, which is assigned to the assignee hereof. The disclosures of all prior Applications are considered part of and are incorporated by reference in this Patent Application.

TECHNICAL FIELD

This disclosure relates generally to processing carbon particles, and specifically, to post-processing carbon powders in a fluidized-bed.

BACKGROUND

Reactors typically include to hold various raw materials, such as carbon (also referred to as "carbonaceous") particles, which may undergo further treatment (referred to as "post-processing") prior to shipment to customers. Through post-processing, the raw materials may be energetically excited by microwave radiation to produce final products, such as carbon-on-carbon growths and/or metal-decorated carbon nano-particulates. For example, the final products may be used in electric vehicle (EV) battery components. Various types of chemical processing methods may be used to post-process carbon particles, such as plasma-based post-processing methods. These methods provide access to desirable chemistries at energy levels that cannot otherwise be attained through conventional thermal or liquid-based processes. In addition, energy transfer between plasma species and raw material gases is faster than convective heating used in thermal processes. As a result, plasma-based post-processing methods may complement fluidized-bed architectures, which also offer fast energy transfer and thereby tend to increase reactor throughput efficiency during batch post-processing of carbon particles. Therefore, further improvements in post-processing of carbon powders in a fluidized-bed is desired.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure may be implemented as a system for post-processing of carbon materials in a fluidized-bed (e.g., a plasma-fluidized bed). In some aspects, the system may include a fluidized-bed reactor with an interior including a fluidized-bed region. The fluidized-bed reactor may be formed as an elongated tube having a top section, bottom section positioned opposite to the top section, a length extending from the top section toward the bottom section, and an outlet extending from the bottom section. In addition, the fluidized-bed reactor may have a gas feed source coupled with the fluidized-bed reactor. In this way, the gas feed source may output a gas-phase mixture into the interior of the fluidized-bed reactor. In some instances, a gas inlet valve may be coupled with and in fluid communication with the gas feed source. In this way, the gas inlet valve may open and/or close and correspondingly regulate flow of the gas-phase mixture into the interior of the fluidized-bed reactor. In one implementation, a gas-solid separator may be located upstream of the gas inlet valve within the fluidized-bed reactor. The gas-solid separator may function to, for example, separate solids from gases in mixtures processed within the interior of the fluidized bed reactor. The outlet of the fluidized-bed reactor may output one or more of the gas-phase mixture or other gases associated with operation of the fluidized-bed reactor. For example, the gas-phase mixture may have a pressure between 1 millitorr (mTorr) and 760 Torr.

In some other aspects, the fluidized-bed reactor may be formed as an elongated cylindrical tube including a main section having a first cross-sectional diameter, and a tapered section coupled with the main section, the tapered section having at least a second cross-sectional diameter that may be different than the first cross-sectional diameter. For example, in some aspects, the tapered section may confine carbon nano-particulates pre-loaded into the fluidized-bed region prior to operation of the fluidized-bed reactor. In addition, the tapered section may include a constricted region that may increase a fluid velocity associated with an insertion of the gas-phase mixture, which may include one or more of a pure gas or a mixture of two or more gases. The gas-phase mixture may prevent at least some carbon nano-particulates from escaping the fluidized-bed reactor. In addition, in some aspects, the fluidized-bed reactor may have a cross-sectional area formed as one of a rectangle, a square, a bell, a circle, or an oval.

In some implementations, carbon nano-particulates in powder form may be loaded into the fluidized-bed region prior to operation of the fluidized-bed reactor. Carbon nano-particulates may include one or more non-hollow carbon spherical (NHCS) particles. In this way, the carbon nano-particulates may be fluidized above the gas-solid separator based on inflow of the gas-phase mixture into the fluidized-bed region. In addition, the carbon nano-particulates may be electromagnetically excited initiated by the energy source. In some instances, a pressure control assembly coupled with the fluidized-bed reactor and may control one or more of a pressure or a gas velocity associated with fluidization of carbon nano-particulates within the fluidized-bed region.

In addition, the system may include an energy source, which may operate in either a pulsed mode or a continuous mode. The energy source may be or include an inductively coupled plasma source, a capacitively coupled plasma source, a microwave coupled plasma torch, a microwave coupled surface wave source, a direct current coupled plasma source, a direct current coupled arc source, or a pulsed direct current plasma source. In some instances, the microwave coupled plasma torch may operate at a pressure between 1 millitorr (mTorr) and 760 Torr. In addition, the microwave coupled plasma torch may be positioned along one or more sides of the fluidized-bed reactor or adjacent to the gas feed source. The microwave coupled plasma torch may disperse a multitude of additional amounts of the plasma-phase mixture into the interior of the fluidized-bed reactor. In this way, the multitude of additional amounts of the plasma-phase mixture may energetically excite one or more of the gas-phase mixture, the plasma-phase mixture, or the carbon nano-particulates. The interior of the fluidized-bed reactor may retain one or more of the gas-phase mixture or the plasma-phase mixture. In addition, the inductively coupled plasma source may be formed as a coil surrounding the fluidized-bed reactor.

In some aspects, the energy source may be positioned at one or more positions relative to the gas inlet valve and/or may be positioned remotely from the fluidized-bed reactor. In some other aspects, the energy source may be positioned at one or more positions of the energy source including one of downstream of the gas inlet valve, upstream of the fluidized-bed region, adjacent to the fluidized-bed region, or downstream of the fluidized-bed region. In one implementation, the energy source may be coupled with the fluidized-bed reactor. In this way, the energy source electromagnetically excite the gas-phase mixture and generate a plasma-phase mixture. In some aspects, the plasma-phase mixture may be formed in a plasma region positioned adjacent to or within the interior of the fluidized-bed reactor. The plasma region may be characterized by one or more of a gas temperature, an electron temperature and velocity, or a fluid flow velocity.

In some instances, a vacuum pump may be coupled with the fluidized-bed reactor and thereby control formation of the fluidized-bed region. For example, the vacuum pump and/or the energy source may control energetic properties of the plasma-phase mixture within the fluidized-bed reactor. In some aspects, the energy source may generate the plasma-phase mixture as one or more of a thermal equilibrium plasma-phase mixture or a non-thermal equilibrium plasma-phase mixture. In addition, a control knob may be coupled with the fluidized-bed reactor. In this way, the control knob may set a thermal equilibrium setting of the plasma-phase mixture. For example, the thermal equilibrium setting may produce either the thermal equilibrium plasma-phase mixture or the non-thermal equilibrium plasma-phase mixture. In addition, the thermal equilibrium setting may control energetic properties associated with one or more of the plasma-phase mixture or the gas-phase mixture. For example, in some instances, energetic properties may include an energy transfer rate between the plasma-phase mixture and the gas-phase mixture. In some other instances, energetic properties may include plasma-material interactions based on interaction between the plasma-phase mixture and carbon nano-particulates.

In some instances, an energy management apparatus may be positioned remote of the fluidized-bed reactor. The energy management apparatus may include a matching network that controls an energetic excitement of the gas-phase mixture via the energy source. In some aspects, a side port may be formed in the fluidized-bed reactor to supply an additional gas-phase mixture into the fluidized-bed reactor. In some instances, the fluidized-bed region may be associated with a fluidized bed architecture, which may control a residence time associated with operation of the matching network.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The drawings described below are for illustration purposes only. The drawings are not intended to limit the scope of the present disclosure.

Like reference numbers and designations in the various drawings indicate like elements.

DETAILED DESCRIPTION

Figure 1:
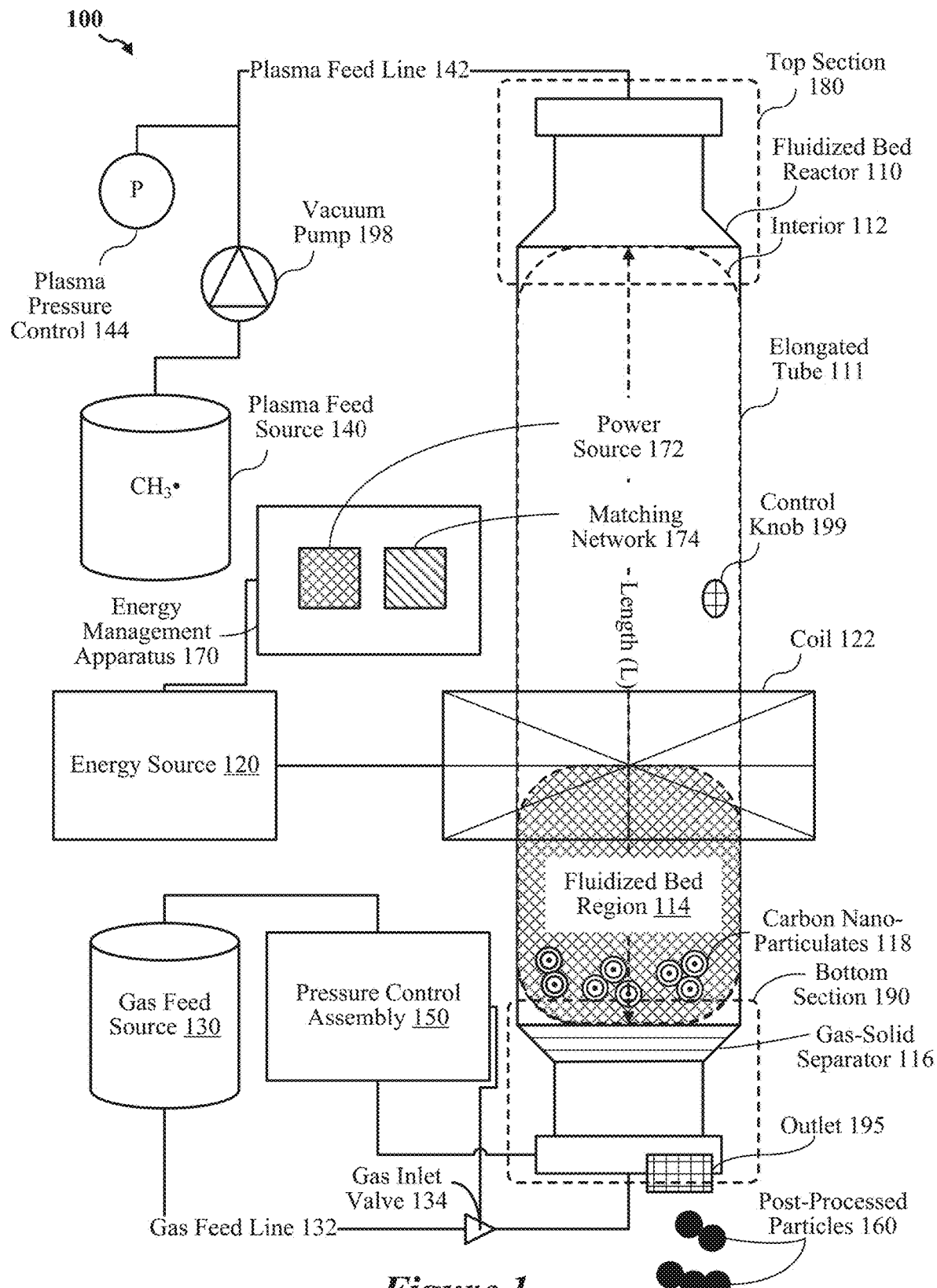
FIG. 1 shows an example system for post-processing carbon nano-particulates in a fluidized bed reactor, according to some implementations.

The following description is directed to some example implementations for the purposes of describing innovative aspects of this disclosure. However, a person having ordinary skill in the art will readily recognize that the teachings herein can be applied in a multitude of different ways. The described implementations can be implemented in any type of fluidized-bed reactor and can be used to post-process carbon particles. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Plasma-based processing of gases and/or solid materials has emerged as a preferred chemical manufacturing solution. In such settings, an energy source (e.g., an inductively coupled plasma, "ICP") may function to energetically excite a reaction chamber containing one or more raw materials (e.g., a hydrocarbon gas, such as methane ($CH_4$)) or semi-finished materials (e.g., carbon particles) intended for post-processing. For processing raw materials such as gases, the energy source may electromagnetically excite and thereby crack the hydrocarbon gas facilitate self-ignition of the gas to form a plasma (e.g., including one or more plasma-based species). Generally, the plasma may not exist within the reaction chamber in thermal equilibrium and may thereby constantly change physical parameters. This constant change within the plasma creates an energetic environment conducive for the further dissociation of, for example, cracked hydrocarbon into methyl radicals, ($CH_3 \bullet$), which may combine and recombine in cooler areas of the reaction chamber to self-nucleate and produce a desired output product, such as a carbon material in powder form (e.g., referred to herein as "carbon particles"). In addition, for post-processing operations, plasmas may facilitate various plasma-material interactions (e.g., ion bombardment), which may be suitable for certain post-processing methods (e.g., carbon-on-carbon growth). Generally, a reaction chamber containing methyl radicals may operate at relatively high-power coupling efficiencies and low ion energies. In this way, the output carbon material may include few layer graphene (FLG), graphenated materials, carbon nano-onions (CNOs), etc. In some instances, the carbon materials can be further post-processed into layered materials within the reaction chamber. The layered materials may be later incorporated into various consumer products, such as carbon-based automotive bumpers, battery electrodes, harmful gas sensors, etc.

Notably, certain plasma-based post-processing methods, e.g., including those used in the semiconductor industry), may offer several desirable performance-related features compared to conventional thermal gas-phase and/or liquid-phase post-processing methods. These features may include providing the ability to access certain chemistry (e.g., of raw materials and/or semi-finished materials) at lower energy levels that cannot otherwise be attained conveniently in conventional thermal-based and/or liquid-based methods. In addition, observed energy transfer rates between plasma species and gases containing within the reaction chamber are faster than convective heating (e.g., as used in thermal processes). In this way, plasma-based post-processing methods tend to complement reactors including reaction vessels having fluidized-bed architectures, which facilitate efficient batch processing. Plasma-based post processing methods may cause energetic ion bombardment, which may increase throughput efficiency of certain processing methods, such as reactive ion etching. Energetic ion bombardment is not available in conventional (e.g., thermal) processing methods.

Aspects of the present disclosure recognize that conventional semiconductor plasma instruments may not employ plasma fluidized bed technology to post-process powdered substrates. In addition, such instruments may not be able to post-processes powdered substrates at industrial (e.g., 10 kilograms per hour or more) levels. In accordance with various aspects of the subject matter disclosed herein, a system for post-processing carbon powders is provided. In some instances, the system may include a fluidized-bed reactor having an interior including a fluidized-bed region. The system may include, a gas feed source, a gas inlet value, a gas-solid separator, and an energy source may be coupled with the fluidized-bed reactor. Carbon nano-particulates in powder form may be loaded into the fluidized-bed region prior to operation of the fluidized-bed reactor. An energy management apparatus may be positioned remote of the fluidized-bed reactor. The gas feed source may output a gas-phase mixture into the interior of the fluidized-bed reactor. In this way, the energy source may electromagnetically excite the gas-phase mixture and generate a plasma-phase mixture formed in a plasma region positioned adjacent to or within the interior of the fluidized-bed reactor. The energy source may be positioned at one or more positions relative to the gas inlet valve.

Aspects of the subject matter disclosed herein may include using the system to perform one or more plasma-based carbon powder post-processing methods, including heteroatom doping, carbon-on-carbon growth, plasma activation, metal decoration, plasma-based etching, carbide formation and/or growth, carbon phase changes (e.g., $sp^2$-hybridization to $sp^3$-hybridization), or carbon-on-carbon grafting. Typically, these processes are performed in static vacuum chambers or vacuum tumbler systems, making industrial scale up difficult or potentially impossible. In addition, vacuum chambers or vacuum tumbler systems may not be able to provide homogeneity of post-processing treatments, resulting in irregular semi-finished materials not suitable for customer usage. Aspects of the subject matter disclosed herein may include using fluidized-bed architectures to homogenously treat (e.g., post-process) carbon particles and/or powders, direct control of residence times, energy transfer rates, and offer adjustable gas temperature processing.

FIG. 1 shows an example system 100 for post-processing carbon nano-particulates in a fluidized bed reactor, according to some implementations. In some instances, the system may include a fluidized-bed reactor 110 with an interior 112 including a fluidized-bed region 114, and an energy source 120 coupled with a coil 122 positioned within a vicinity of the fluidized-bed reactor 110. The fluidized-bed reactor 110 may be formed as an elongated tube 111 having a top section 180, a bottom section 190 positioned opposite to the top section 180, a length extending from the top section 180 toward the bottom section 190, and an outlet 195 extending from the bottom section. In addition, the fluidized-bed reactor 110 may be coupled with a gas feed source 130. In this way, the gas feed source 130 may output a gas-phase mixture (e.g., including one or more hydrocarbon gases, such as methane ($CH_4$) and not shown in FIG. 1 for simplicity) into the interior 112 of the fluidized-bed reactor 110. For example, in some instances, the gas-phase mixture may include one or more of a pure gas or a mixture of two or more gases. In some instances, a gas inlet valve 134 may be coupled with and/or in fluid communication with the gas feed source 130. In this way, the gas inlet valve 134 may open and/or close and correspondingly regulate flow of the gas-phase mixture into the interior 112 of the fluidized-bed reactor 110. In one implementation, a gas-solid separator 116 may be located upstream of the gas inlet valve 134 within the fluidized-bed reactor 110. The gas-solid separator 116 may function to, for example, separate solids from gases in mixtures processed within the interior 112 of the fluidized-bed reactor 110. The outlet of the fluidized-bed reactor may output of the gas-phase mixture or other gases associated with operation of the fluidized-bed reactor (not shown in FIG. 1 for simplicity) and/or post-processed particles 160. For example, the gas-phase mixture may have a pressure between 1 millitorr (mTorr) and 760 Torr. Operationally, the carbon nano-particulates 118 may be suspended in the fluidized-bed region 114 within the interior 112 of the fluidized-bed reactor 110. In this way, at least some of the carbon nano-particulates 118 may be treated and/or post-processed by gases and/or plasma species generated upon energetic excitement of gases within the interior 112. Post-processing operations may, for example, grow additional carbon on exposed surfaces of the carbon nano-particulates 118, thereby providing for carbon-on-carbon growth. Other post-processing operations may also be supported by the fluidized-bed reactor 110 and are described elsewhere in the present disclosure.

In some other aspects, the fluidized-bed reactor 110 may be formed as an elongated tube 111 (e.g., an elongated cylindrical tube) that may include a main section having a first cross-sectional diameter (not shown in FIG. 1 for simplicity) and a tapered section coupled with the main section. The tapered section may have at least a second cross-sectional diameter that may be different than the first cross-sectional diameter. For example, in some aspects, the tapered section may at least temporarily confine the carbon nano-particulates 118 pre-loaded into the fluidized-bed region 114 prior to operation of the fluidized-bed reactor 110. In addition, the tapered section may include a constricted region (not shown in FIG. 1 for simplicity) that may increase a fluid velocity associated with an insertion of the gas-phase mixture. In this way, the gas-phase mixture may prevent the carbon nano-particulates 118 from escaping the fluidized-bed reactor 110. In addition, in some aspects, the fluidized-bed reactor 110 may have a cross-sectional area (not shown in FIG. 1 for simplicity) formed as one of a rectangle, a square, a bell, a circle, or an oval.

In some implementations, the carbon nano-particulates 118 may be prepared in powder form and may be loaded into the fluidized-bed region prior to operation of the fluidized-bed reactor. In some instances, the carbon nano-particulates 118 may include one or more non-hollow carbon spherical (NHCS) particles as described elsewhere in the present disclosure. In this way, the carbon nano-particulates 118 may be fluidized above the gas-solid separator 116 based on inflow of the gas-phase mixture into the fluidized-bed region 114. In addition, the carbon nano-particulates 118 may be electromagnetically excited as initiated by the energy source 120 and/or the coil 122. In addition, in some instances, a pressure control assembly 150 may be coupled to the fluidized-bed reactor 110 may thereby control a pressure and/or a gas velocity associated with fluidization of carbon nano-particulates 118 within the fluidized-bed region 114. In some other instances, the system 100 may be configured to be coupled with a plasma feed source 140, which may contain one or more plasma-based species (e.g., methyl radicals, $CH_3 \cdot$), by a plasma feed line 142 controlled by a plasma pressure control 144. In this way, additional quantities of energized substances, e.g., plasma-based species stored in the plasma feed source, may be added to gases flowed into the fluidized-bed region 114 to provide for additional tunability of the system 100.

In addition, regarding processing tunability of the system 100, the system may include the energy source 120, which may operate in either a pulsed mode or a continuous mode. For example, the energy source 120 may be or include an inductively coupled plasma source, a capacitively coupled plasma source, a microwave coupled plasma torch, a microwave coupled surface wave source, a direct current coupled plasma source, a direct current coupled arc source, or a pulsed direct current plasma source. In some instances, the energy source 120 may be configured as a microwave coupled plasma torch, which may operate at a pressure between 1 millitorr (mTorr) and 760 Torr. In addition, the microwave coupled plasma torch may be positioned (e.g., by the coil 122) along one or more sides of the fluidized-bed reactor or adjacent to the gas feed source. The microwave coupled plasma torch may disperse a multitude of additional amounts of, for example, a plasma-phase mixture (not shown in FIG. 1 for simplicity) into the interior of the fluidized-bed reactor 110. In this way, the multitude of additional amounts of the plasma-phase mixture may energetically excite one or more of the gas-phase mixture, the plasma-phase mixture, or the carbon nano-particulates 118, e.g., as may be associated with post-processing. In some instances, the interior of the fluidized-bed reactor 110 may retain one or more of the gas-phase mixture or the plasma-phase mixture. In addition, in some implementations, the inductively coupled plasma source may be formed as the coil 122 surrounding the fluidized-bed reactor.

In some aspects, the energy source 120 may be positioned at one or more positions (not shown in FIG. 1 for simplicity) relative to the gas inlet valve 134 and/or may be positioned remotely from the fluidized-bed reactor 110. In some other aspects, the energy source 120 may be positioned at one or more positions, including one of downstream of the gas inlet valve 134, upstream of the fluidized-bed region 114, adjacent to the fluidized-bed region 114, or downstream of the fluidized-bed region 114. In one implementation, the energy source 120 may be coupled to the fluidized-bed reactor 110. In this way, the energy source may electromagnetically excite the gas-phase mixture and generate a plasma-phase mixture. In some aspects, the plasma-phase mixture may be formed in a plasma region (not shown in FIG. 1 for simplicity) positioned adjacent to or within the interior 112 of the fluidized-bed reactor 110. The plasma region may be characterized by one or more of a gas temperature, an electron temperature and velocity, or a fluid flow velocity.

In some instances, a vacuum pump 198 may be coupled with the fluidized-bed reactor 110 and thereby control formation of the fluidized-bed region 114. The vacuum pump 198 is shown coupled to the plasma feed source 140 in FIG. 1, although other placements and/or configurations are possible. In the example configuration shown in FIG. 1, the vacuum pump 198 may regulate flow of additional quantities of plasma-based species contained within the plasma feed source 140 and flowed into the top section 180 of the fluidized-bed reactor 110 through the plasma feed line 142. In one or more alternative configurations, the vacuum pump 198 may be coupled to the energy source 120, the gas feed source 130, and/or the pressure control assembly 150 to function in tandem with the gas inlet valve 134 and/or the gas feed line 132 to regulate flow of plasma and/or gas species into the interior of the fluidized-bed reactor 110. For example, in one implementation, the vacuum pump 198 and/or the energy source 120 may control energetic properties of the plasma-phase mixture within the fluidized-bed reactor 110. In some aspects, the energy source 120 may generate the plasma-phase mixture as one or more of a thermal equilibrium plasma-phase mixture or a non-thermal equilibrium plasma-phase mixture. In addition, a control knob 199 may be coupled to the fluidized-bed reactor 110. In this way, the control knob 199 may set a thermal equilibrium setting of the plasma-phase mixture. For example, the thermal equilibrium setting may produce either the thermal equilibrium plasma-phase mixture or the non-thermal equilibrium plasma-phase mixture. In addition, the thermal equilibrium setting may control energetic properties associated with one or more of the plasma-phase mixture or the gas-phase mixture. For example, in some instances, energetic properties may include an energy transfer rate between the plasma-phase mixture and the gas-phase mixture. In some other instances, energetic properties may include plasma-material interactions based on interaction between the plasma-phase mixture and carbon nano-particulates 118.

In some instances, an energy management apparatus 170 may be positioned remote of the fluidized-bed reactor 110. The energy management apparatus 170 may include a power source 172 and a matching network 174. The power source 172 may provide power to the energy source 120. The matching network 174 may energetically excite of the gas-phase mixture using the energy source 120. In addition, a side port (not shown in FIG. 1 for simplicity) may be formed in the fluidized-bed reactor. In this way, the side port may supply an additional gas-phase mixture into the fluidized-bed reactor. In some instances, the fluidized-bed region may be associated with a fluidized bed architecture, which may thereby control a residence time associated with operation of the power source and the matching network. Generally, a fluidized-bed architecture may imply a physical phenomenon that occurs when a solid particulate substance (usually present in a holding vessel) is under certain conditions such that it behaves like a fluid. Fluidized beds (e.g., the fluidized-bed region 114) may be achieved by pumping pressurized fluid into particles (e.g., the carbon nano-particulates). The resulting medium may have properties and characteristics of normal fluids, such as the ability to free-flow under gravity, or to be pumped using fluid technologies.

In this way, the fluidized-bed reactor 110 may modify a particle morphology of one or more carbon nano-particulates, modify a crystal structure of one or more carbon nano-particulates, chemically alter one or more exposed surfaces of at least one carbon nano-particulates. In addition, the fluidized-bed reactor 110 may deposit one or more materials on one or more exposed surfaces of at least one carbon nano-particulate. In addition, in some aspects, the fluidized-bed reactor 110 may be associated with performance of one of post-processing by reactive ion etching, heteroatom doping of at least some carbon nano-particulates, and/or carbon-on-carbon growth on at least some carbon nano-particulates. In some other aspects, the fluidized-bed reactor 110 may be associated with performance of one of plasma activation of at least some carbon nano-particulates, metal decoration of at least some carbon nano-particulates, plasma-based etching of at least some carbon nano-particulates. In addition, the fluidized-bed reactor 110 may be associated with performance of one of carbide formation and growth on at least some carbon nano-particulates, carbon phase changes from $sp^2$-phase to $sp^3$-phase of at least some carbon nano-particulates, or carbon-on-carbon grafting of at least some carbon nano-particulates. In this way, the fluidized-bed reactor 110 may homogenize at least some carbon nano-particulates in powder form.

Figure 2A:
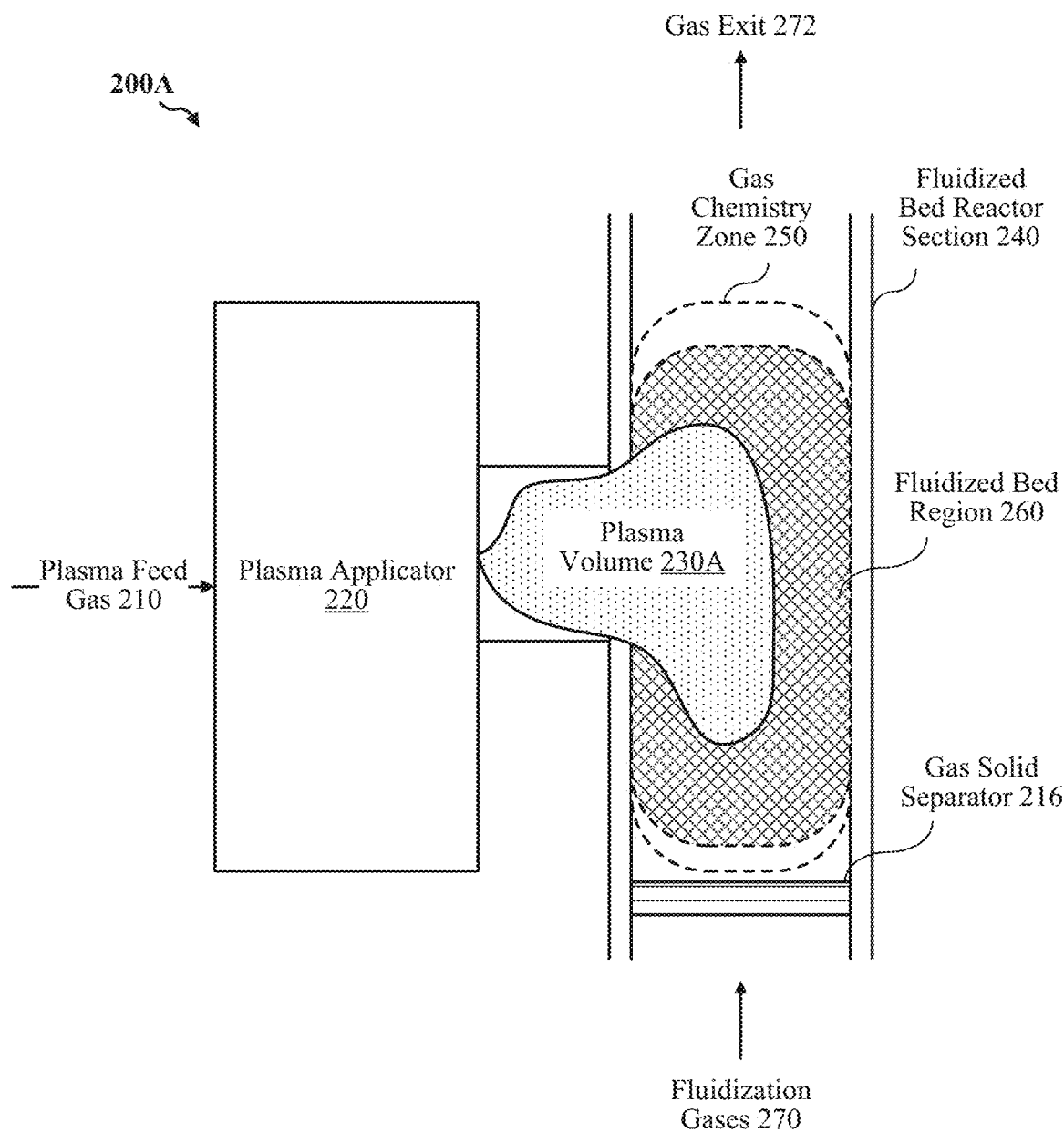
FIG. 2A shows an example configuration of the fluidized bed reactor depicted in FIG. 1, according to some implementations.

FIG. 2A shows an example configuration 200A of the fluidized-bed reactor 110 depicted in FIG. 1, according to some implementations. The example configuration 200A may be referred to an "adjacent plasma." In some instances, a plasma feed gas 210 may be supplied to a plasma applicator 220 positioned adjacent to a fluidized bed reactor section 240, which may be one example of the fluidized-bed reactor 110 depicted in FIG. 1. In this way, the plasma applicator may inject a plasma volume 230A into a fluidized bed region 260 positioned above a gas solid separator 216 and thereby produce a gas chemistry zone 250 extending lengthwise along the fluidized bed reactor section 240. Fluidization gases 270 may flow into the fluidized bed reactor section 240 and contact one or more of the plasma volume 230A, the gas chemistry zone 250, and/or the fluidized bed region 260. For example, at least some of the fluidization gases 270 may at least partially suspend one or more of the carbon nano-particulates 118 of FIG. 1 (not shown in FIG. 2A for simplicity) and permit for the plasma volume 230A to contact the carbon nano-particulates 118 that are suspended within the fluidized bed region 260. In this way, the carbon nano-particulates 118 may be post-processed in one or more particular enumerated methods, e.g., carbon-on-carbon growth, etc., by tuning placement and/or orientation of the plasma volume 230 as it enters the fluidized bed region 260.

Figure 2B:
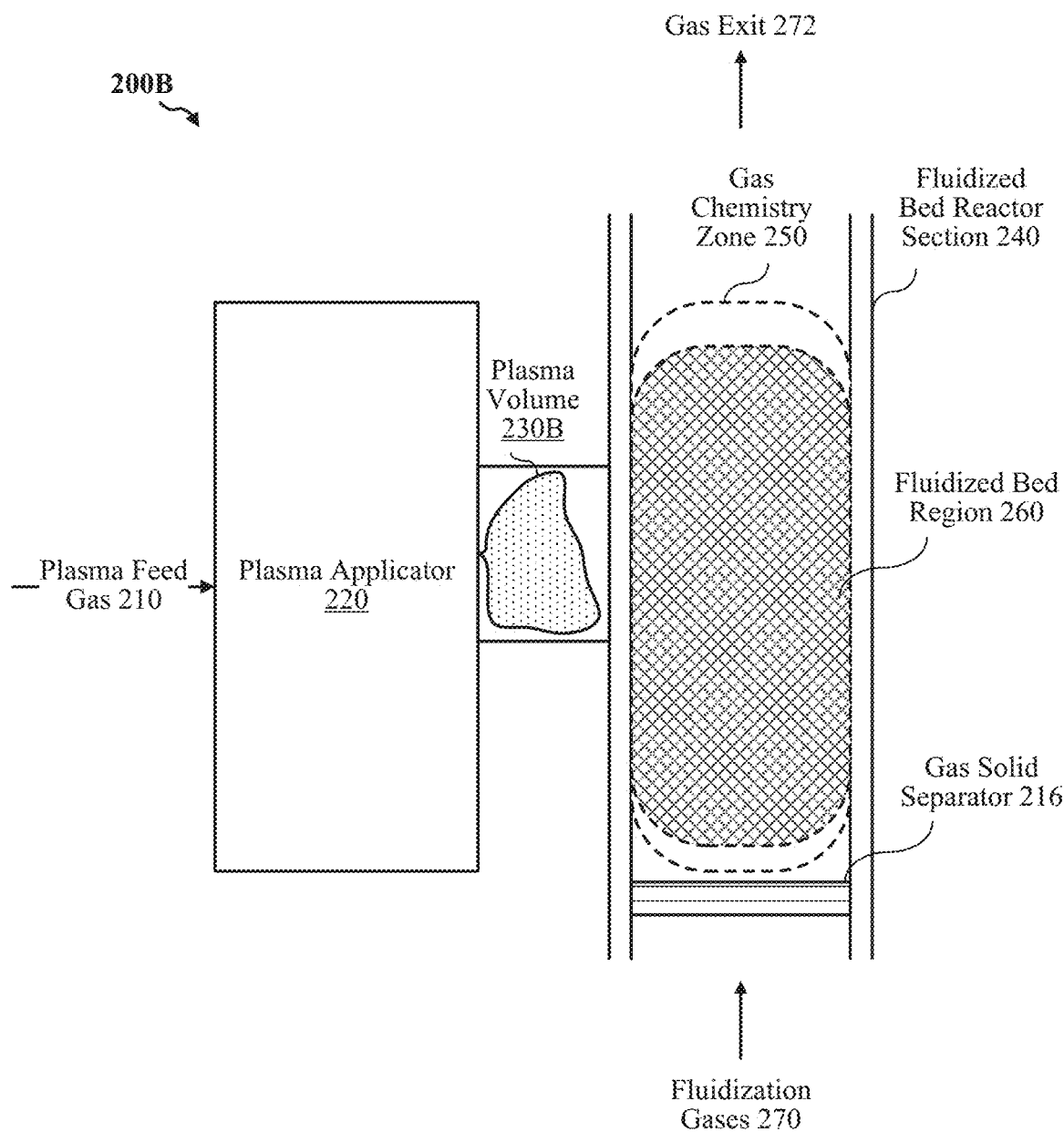
FIG. 2B shows another example configuration of the fluidized bed reactor depicted in FIG. 1, according to some implementations.

FIG. 2B shows another example configuration 200B of the fluidized-bed reactor 110 depicted in FIG. 1, according to some implementations. The example configuration 200A may be referred to a "remote plasma." The configuration 200B may be one example of the configuration 200A of FIG. 2A, with the exception of positioning of a plasma volume 230B. Instead of entering into a fluidized bed region 260, the plasma volume 230 may be positioned adjacent to the fluidized bed reactor section 240 to correspondingly post-process materials suspended within the fluidized bed region 260.

Figure 3:
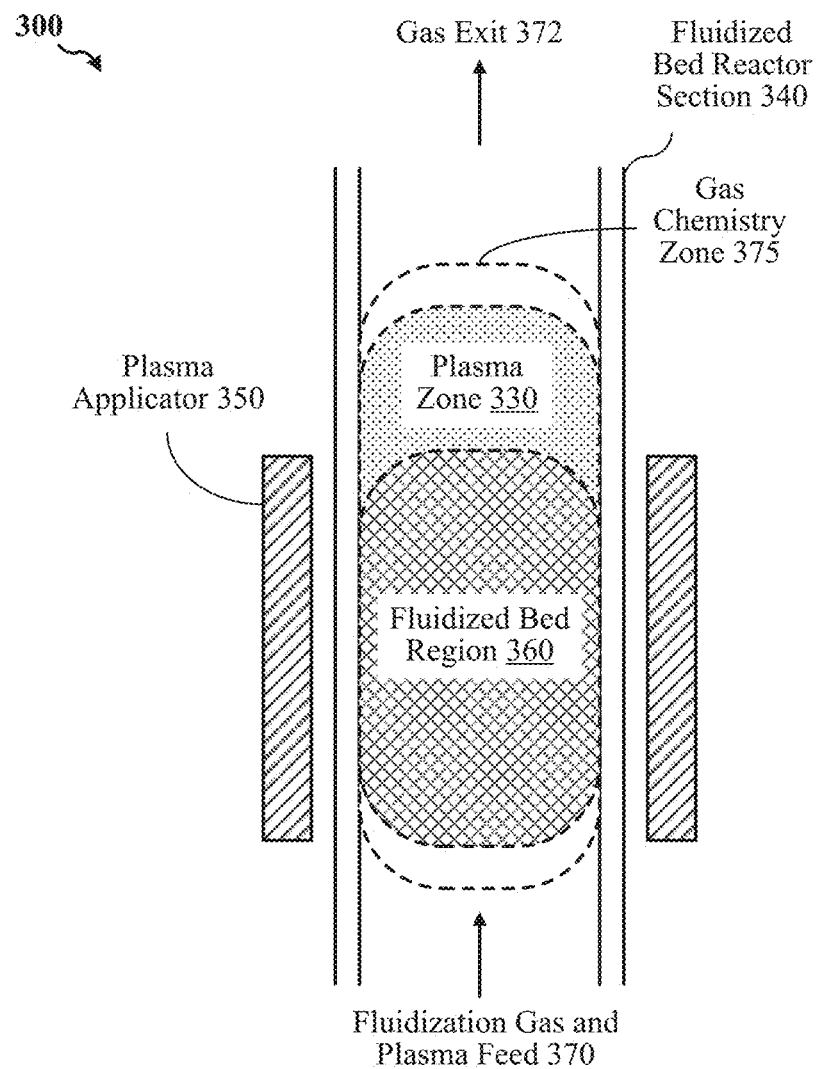
FIG. 3 shows another example configuration of the fluidized bed reactor depicted in FIG. 1, according to some implementations.

FIG. 3 shows another example configuration 300 of the fluidized-bed reactor 110 depicted in FIG. 1, according to some implementations. The example configuration 300 may be referred to a "direct plasma." The configuration 300 may include a fluidized bed reactor section 340, which may be one example of the fluidized-bed reactor 110 of FIG. 1. The fluidized bed reactor section 340 may be flanked by a plasma applicator 350 on multiple sides of the fluidized bed reactor section 340. In this way, the plasma applicator 350 may energetically excite a fluidization gas and plasma feed 370 fed into a fluidized bed region 260 of the fluidized bed reactor section 240 and generate a plasma zone 330 and/or a gas chemistry zone 375 as depicted in FIG. 3. In addition, at least some of the fluidization gas and plasma feed 370 may escape through a gas exit 372 positioned opposite to entrance of the fluidization gas and plasma feed 370.

Figure 4:
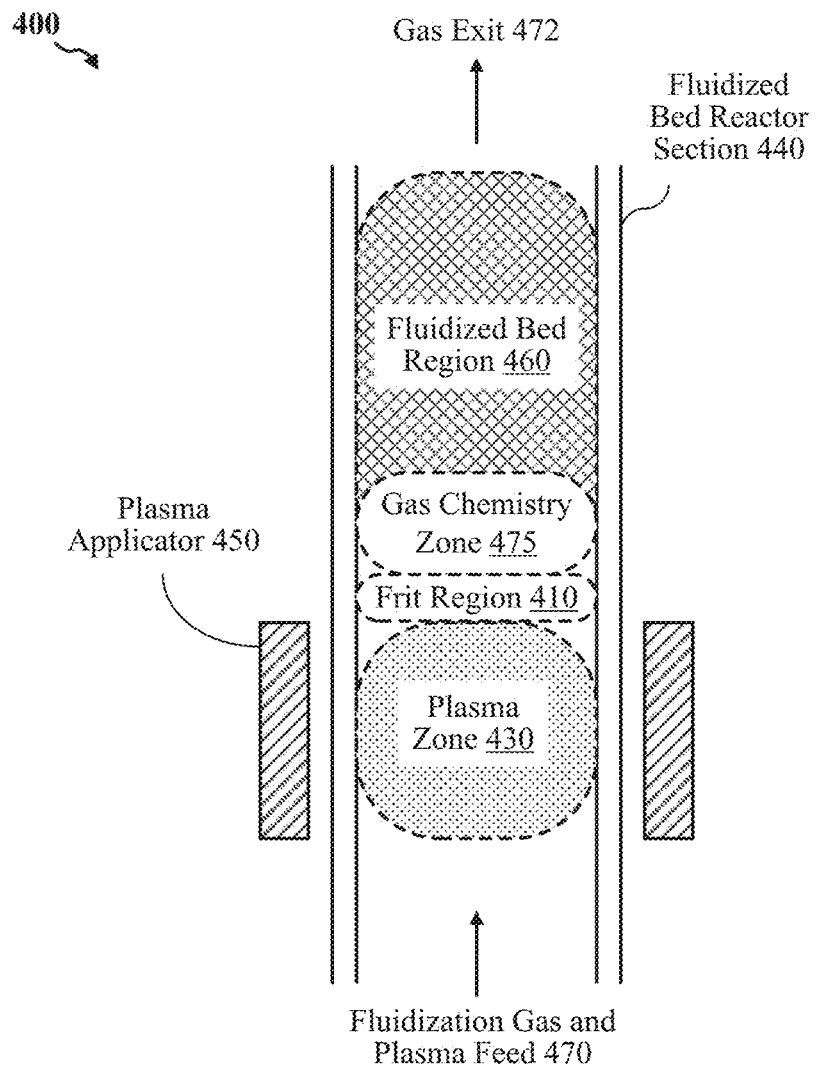
FIG. 4 shows another example configuration of the fluidized bed reactor depicted in FIG. 1, according to some implementations.

FIG. 4 shows another example configuration 400 of the fluidized-bed reactor 110 depicted in FIG. 1, according to some implementations. The configuration 400 may be one example of the configuration 300 of FIG. 3, with the exception that a plasma zone 430 may be generated beneath a frit region 410. In this way, the example configuration 400 may be referred to a "remote plasma below frit." In some instances, the frit region 410 may be suitable for formation of one or more compositions, including ceramic compositions, which may be fused, quenched and/or granulated, as well as for mixing of species provided by the fluidization gas and plasma feed 470. In this way, the configuration 400 may produce a gas chemistry zone 475 suitable for post-processing the carbon nano-particulates 118 (not shown in FIG. 4) within a fluidized bed region 460 positioned above the plasma zone 430.

Figure 5:
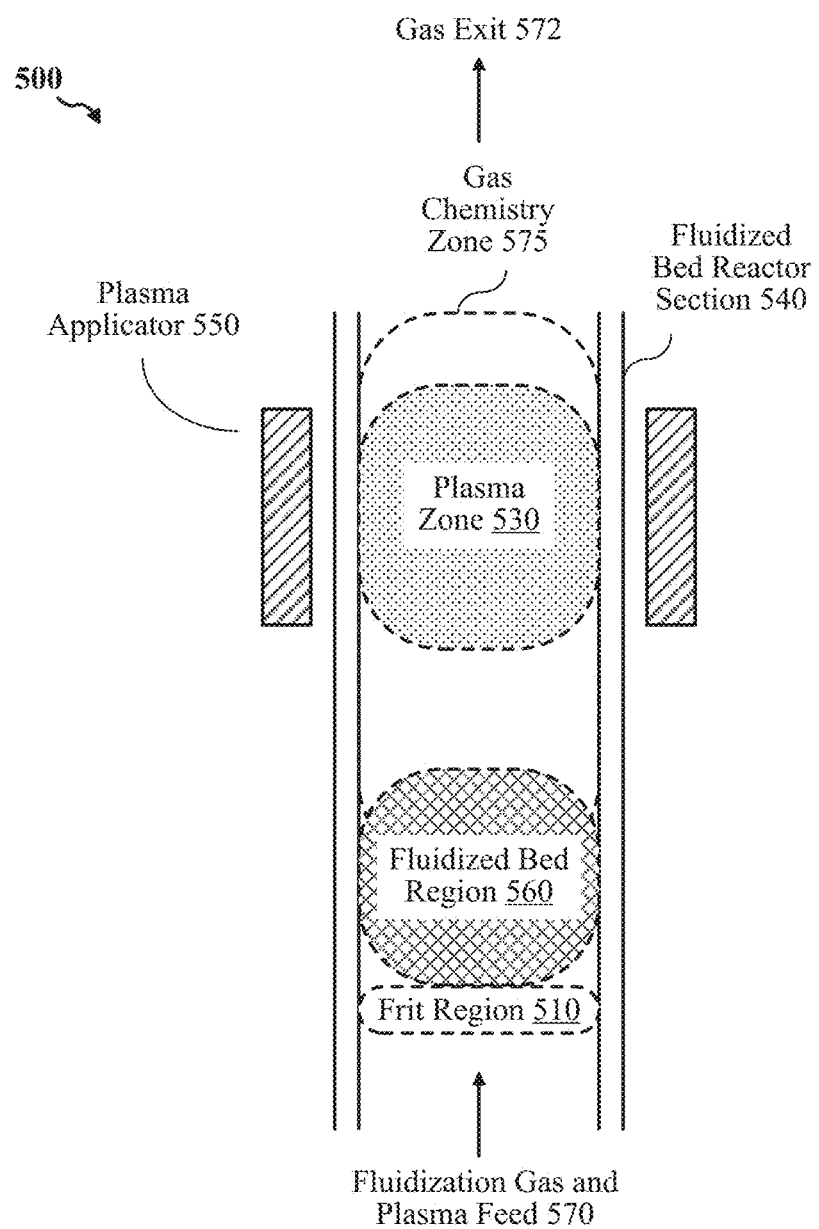
FIG. 5 shows another example configuration of the fluidized bed reactor depicted in FIG. 1, according to some implementations.

FIG. 5 shows another example configuration 500 of the fluidized-bed reactor 110 depicted in FIG. 1, according to some implementations. The configuration 500 may be one example of the configuration 400 of FIG. 4, with the exception that a plasma zone 530 may be generated above a gas-solid region 510. In addition, the configuration 500 may include a plasma applicator 550 flanking a fluidized bed reactor section 540 to produce the plasma zone 530 above a fluidized bed region 560 and a gas chemistry zone 575 that extends away from the plasma zone 530 toward a gas exit 572.

Figure 6:
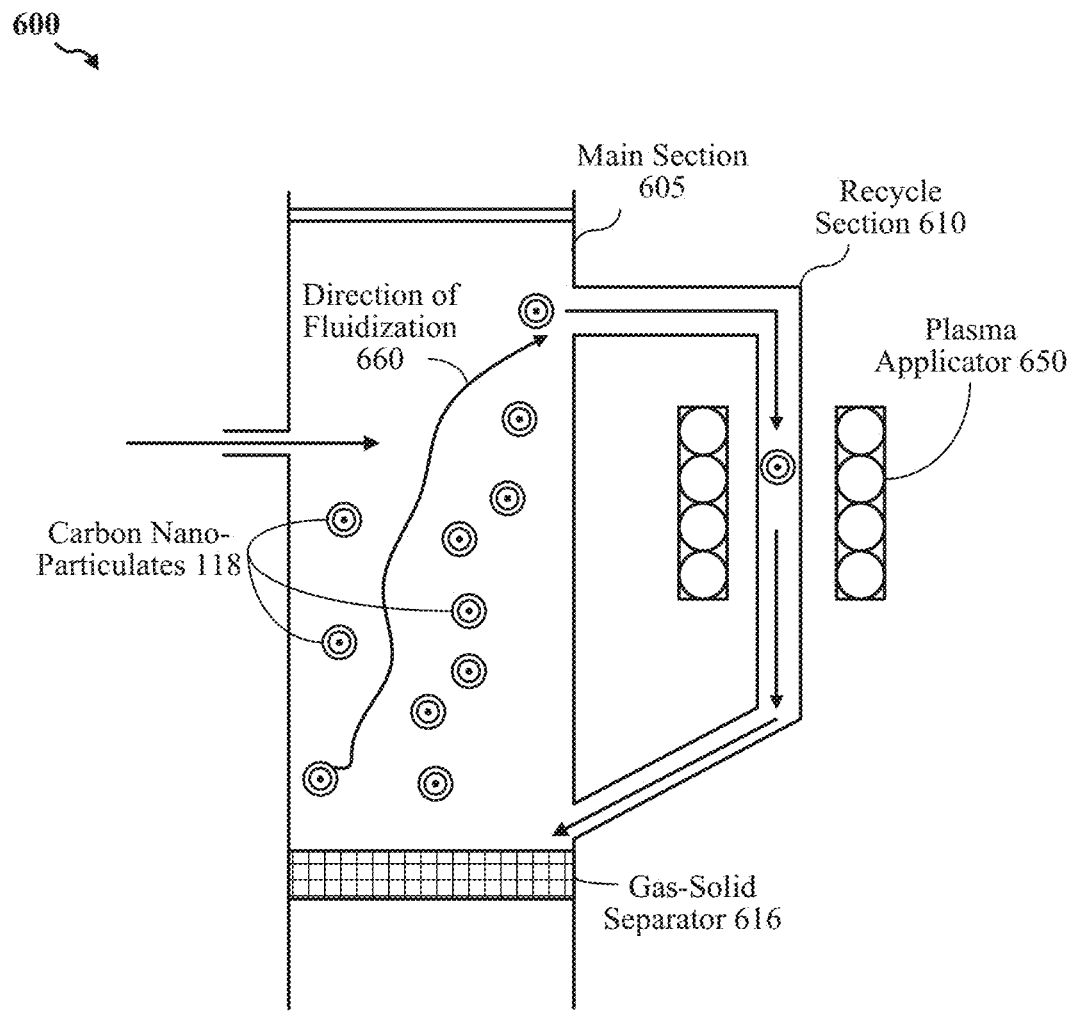
FIG. 6 shows an example recirculating bed configuration of at least a section of the fluidized bed reactor depicted in FIG. 1, according to some implementations.

FIG. 6 shows an example recirculating bed configuration 600 of the fluidized-bed reactor 110 depicted in FIG. 1, according to some implementations. In some instances, the configuration 600 may be one example of the fluidized-bed reactor 110 of FIG. 1. For example, the configuration 600 may include a recycle section 610, which may extend outwardly from a main section 605. In this way, the carbon nano-particulates may be suspended within the configuration 600 and travel in a direction of fluidization 660 into the recycle section 610. Here, the carbon nano-particulates may be energetically excited by a plasma applicator 650 to return to the main section and be floated above a gas-solid separator 616 to optionally recycle through to the recycle section 610.

Figure 7:
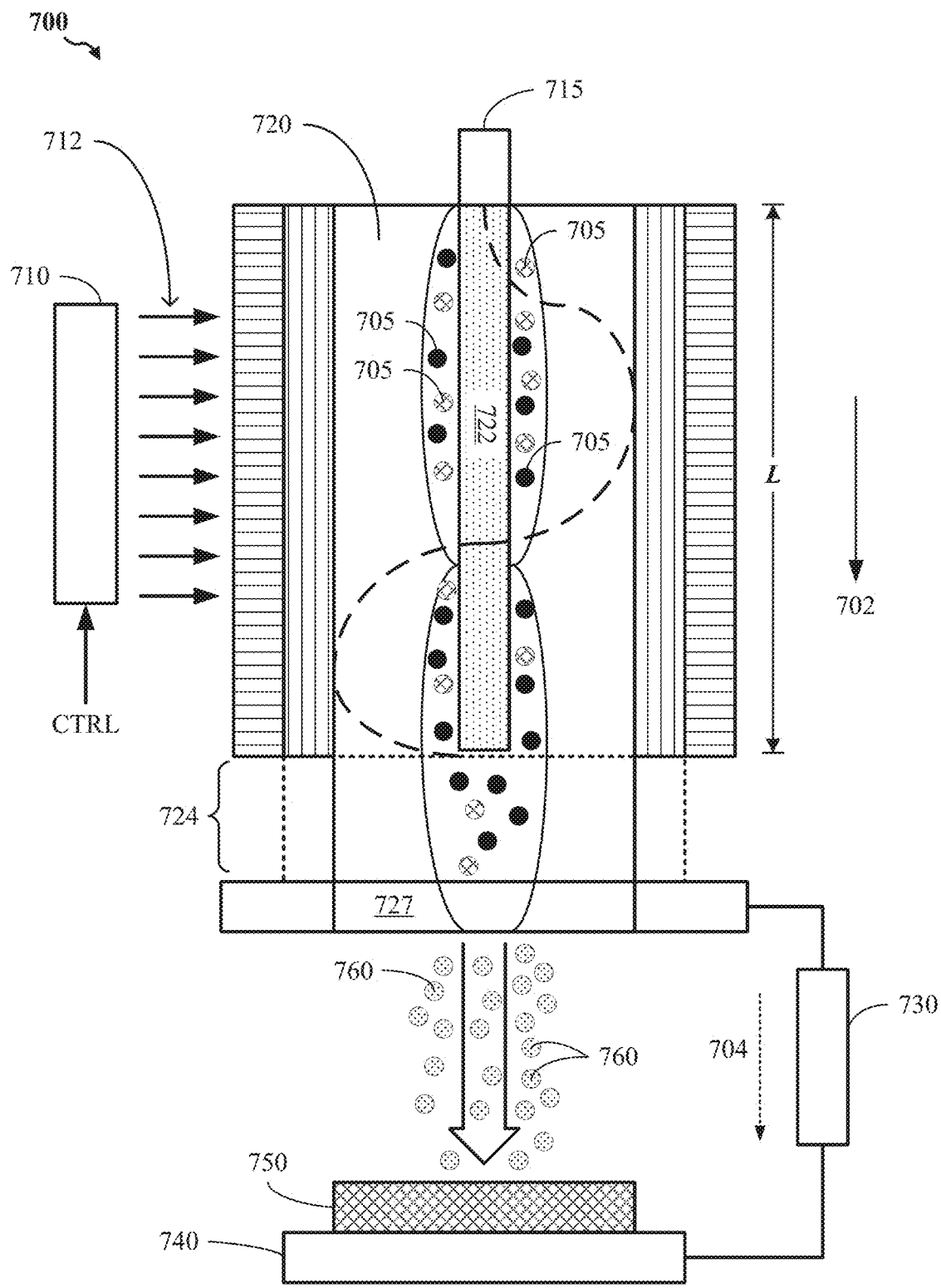
FIG. 7 shows an example reactor for producing carbon particles or post-processing carbon nano-particulates depicted in FIG. 1, according to some implementations.

FIG. 7 shows an example reactor 700, according to some implementations. In some instances, the reactor 700 may be one example of the fluidized-bed reactor 110 of FIG. 1. In addition, or in the alternative, the reactor 700 may be implemented as a plasma torch. The reactor 700 may include a microwave energy source 710, an input gas inlet 715, a reaction vessel 720, an electric potential source 730, and a metal substrate 740. The reaction vessel 720 may include a reaction chamber 722, a downstream region 724, and a collector 726. The reaction chamber 722 has a length L along a direction 702 parallel to the reaction chamber 722. The input gas inlet 715 is coupled between the reaction vessel 720 and a process material source (not shown for simplicity), and may be used to flow or otherwise provide materials 705 (such as one or more gases, liquids, particles, etc.) into the reaction chamber 722. For example, in some instances, the materials 705 may include various structured carbons such as (but not limited to) CNTs, fullerenes, and the like.

The microwave energy source 710 may generate a microwave energy 712 that can excite the materials 705 to generate a plasma from which carbon-based radicals can be separated or extracted. In some instances, the microwave energy source 710 may generate a pulsed microwave energy, for example, as described in commonly owned U.S. Pat. Nos. 9,767,992 and 10,314,512. In other instances, the microwave energy source 710 may generate a continuous microwave energy. The microwave energy source 710 may include control circuitry that can adjust various characteristics of the microwave energy 712 based on one or more control signals (CTRL). For example, the CTRL signals may determine one or more of a pulse duration, a pulse frequency, a duty cycle, an instantaneous power level, or an average power level of the microwave energy 712. In this way, the reactor 700 may configure the sizes, numbers of graphene layers, and concentrations of few layer graphene (FLG) nanoplatelets to be formed in, for example, a substrate 750 by adjusting the pulse duration, pulse frequency, duty cycle, instantaneous power level, and/or average power level of the microwave energy 712 generated to create the non-thermal equilibrium plasma in the reaction chamber 722. The ability to control the energy applied to the non-thermal equilibrium plasma allows targeted reactions to occur and facilitates the distribution of FLG nanoplatelets and other particles throughout the substrate 750.

In some implementations, a mixture of hydrocarbon gas and silane may be flowed into the reaction chamber 722 through the input gas inlet 715 at a suitable flow rate. The hydrocarbon gas may be any suitable carbon-containing gas such as (but not limited to) methane gas. The silane may be any suitable silane gas or silane-containing liquid precursor. In some aspects, the silane may be flowed into the reaction chamber 722 at a flow rate between approximately 1 standard liter per minute (slm) and 10 slm per minute. In some aspects, additives may be provided to the reaction chamber 722, for example, concurrently with flowing the mixture into the reaction chamber 722. In some instances, the additive may include an alkali metal (such as lithium, sodium, potassium, calcium, fluorine, or bromine), a transition metal (such as copper or iron), or any combination thereof. In other instances, the additive may include lithium, nickel, manganese, copper, tri-methyl aluminum (TMA), tri-methyl gallium (TMG), sulfur, or any combination thereof. The additive may be flowed into the reactor at a flow rate that is between approximately 1% to 75% of the flow rate of the hydrocarbon gas.

Microwave energy 712 generated by the microwave energy source 710 can be directed into portions of the reaction chamber 722 containing the mixture of hydrocarbon gas and silane. The microwave energy 712, which may have a power level between approximately 300 watts (W) and 25 kilowatts (kW), can excite the mixture of hydrocarbon gas and silane to produce a non-thermal equilibrium plasma. In some aspects, the microwave energy source 710 can be a klystron or a traveling wave tube amplifier (TWTA). The non-thermal equilibrium plasma may include carbon-based radicals (such as methyl radicals), positive charged particles, ionized inert gas particles, or any combination thereof. In various implementations, the carbon-based radicals, the positive charged particles, and/or the ionized inert gas particles 760 output from the reaction chamber 722 via the collector 726 can be directed towards a surface-to-air interface of the substrate 750 via bombardment and/or implantation. The substrate 750 may be bombarded by the carbon-based radicals, the positive charged particles, and/or the ionized inert gas particles to form, strengthen, and/or reinforce one or more portions of the substrate 750. The portions of the substrate 750 formed, strengthened, or reinforced in accordance with the techniques disclosed herein may have increased compressive strength, increased tensile strength, and increased fracture toughness, and are therefore more resilient to cracking and surface defects than conventional substrates, e.g., glass materials.

More specifically, the surface-to-air interface of the substrate 750 may be bombarded with carbon-based radicals and ionized inert gas particles separated from the non-thermal equilibrium plasma in the reaction chamber 722. The ionized inert gas particles may penetrate the surface-to-air interface of the substrate 750 and form microcracks, micro-voids, and/or surface defects within portions of the substrate 750 beneath the surface-to-air interface. In some aspects, the microcracks, micro-voids, and/or surface defects formed by ion-bombardment of the substrate 750 may define an interphase region of the substrate 750. The carbon-based radicals that penetrated the surface-to-air interface of the substrate 750 may be implanted within the interphase region.

In some implementations, an external electric field may be applied to the reaction chamber 722 to accelerate the positive charged particles through the reaction chamber 722 along a direction 704 towards the substrate750, thereby increasing the speed and energy with which the positive charged particles can impact the surface-to-air interface of the substrate750. For example, the electric potential source 730 may generate a negative electric field or potential that can accelerate the positive charged particles along the direction 704 towards the substrate750 situated on the metal substrate 740. In some aspects, the negative electric potential generated by the electric potential source 730 may be configured to extract or separate positive charged gas particles from the non-thermal equilibrium plasma based on electric polarities. In this way, the negative electric field or potential may allow positive charged particles, as wells as ionized inert gas particles and carbon-based radicals, to penetrate deeper into the interphase region of the substrate750.

In various implementations, the reactor 700 may be cylindrically-shaped with a diameter up to 1 inch. In some implementations, the reactor 700 may be configured as Gaussian reactors, while in other implementations, the reactor 700 may be configured as non-Gaussian reactors (such as where plasmas generated in non-Gaussian reactors typically exhibit a superior energy dissipation and distribution than plasmas generated in Gaussian reactors).

Figure 8:
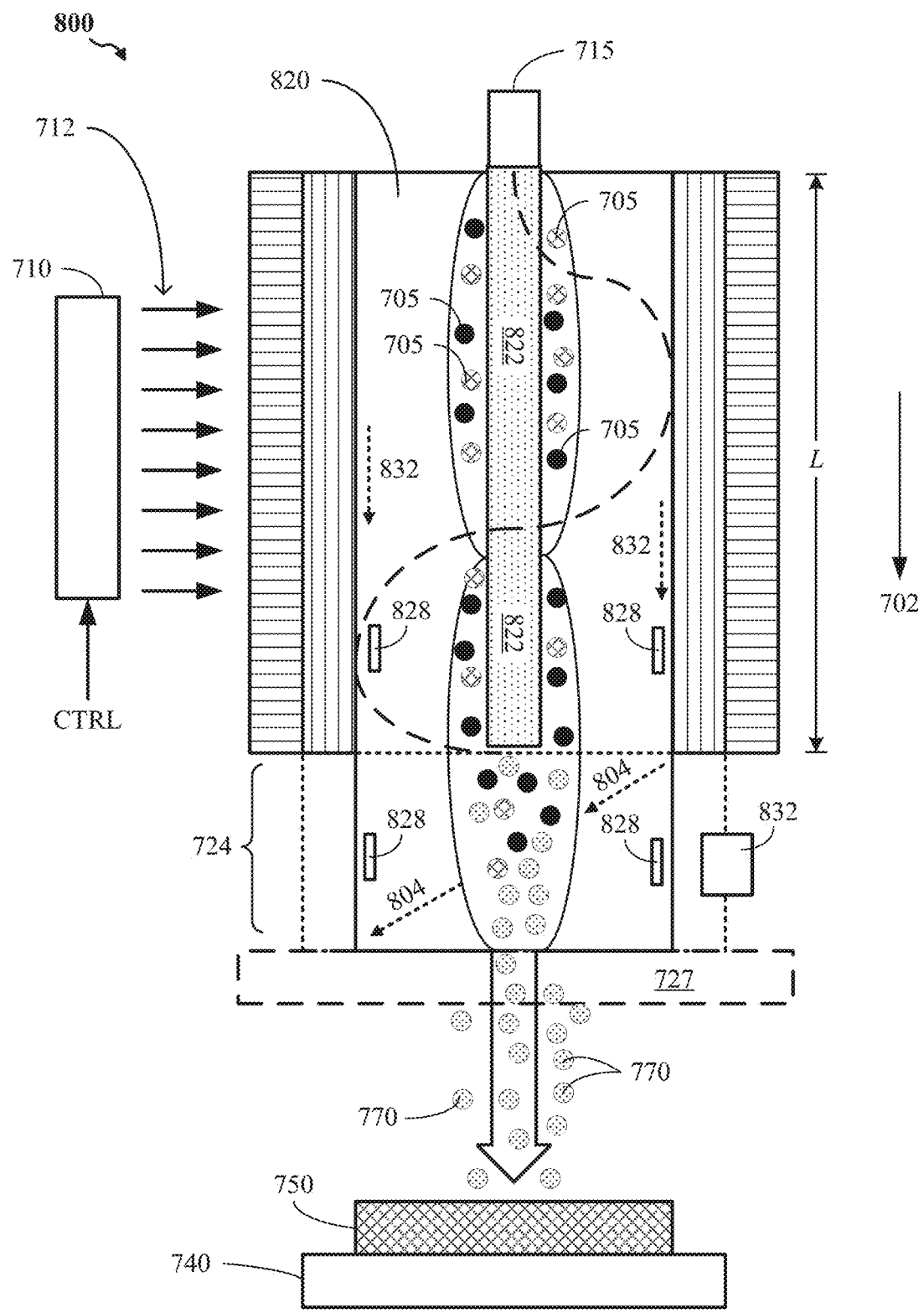
FIG. 8 shows another example reactor for producing carbon particles or post-processing carbon nano-particulates depicted in FIG. 1, according to some implementations.

FIG. 8 shows another example reactor 800, which may be one example of the reactor 700 of FIG. 7 and/or the fluidized-bed reactor 110 of FIG. 1. The reactor 800 may be similar in some aspects to the reactor 700 of FIG. 7, and may differ in other aspects from the reactor 700 of FIG. 7. For example, the reactor 800 may include the microwave energy source 710, the input gas inlet 715, a reaction chamber 820, an electric potential source 830, the metal substrate 740, and the collector 726. One aspect in which the reactor 800 differs from the reactor 700 is that rather than having the electric potential source 730 to generate an electric field within one or more portions of the reaction chamber 820, the reactor 800 includes a plurality of electrodes 828 positioned on opposite sides of one or more portions of the reaction chamber 820. The electrodes 828 may be configured to generate an internal electric field (e.g., based on a current and/or voltage provided by an electric supply) that can accelerate the plurality of positive charged particles. In addition, or in the alternative, the reactor 800 may also include an additional electric potential source (not shown for simplicity) positioned such that a negative electric potential appears across the reaction chamber 822 along a direction 804, and induces current flow 832 along the interior-facing walls of the reaction chamber 822. The current flow 832 induced within the reaction chamber 822 may create a magnetic field that can attract and accelerate at least the positive charged gas particles through the reaction chamber 822 and output from the collector 726 towards the substrate 750.

In addition to methane gas being applied to reactor 700 and reactor 800 to generate carbon-based radicals, a carbon-containing precursor, may include any known carbon particles or structures such as those disclosed in ISO/TS 80004-13: 2017(en) entitled "Nanotechnologies Vocabulary—Part 13: Graphene and related two-dimensional (2D) materials."

In some aspects, the hydrocarbon gas flowed into the reactor 800 may be a short-chain hydrocarbon gas, while in other aspects, the hydrocarbon gas flowed into the reactor 800 may be a long-chain hydrocarbon gas. Specifically, the hydrocarbon gas may include methane ($CH_4$) and/or butane ($C_4H_{10}$). In various implementations, the generation of suitable carbon-based radicals from a non-thermal equilibrium plasma may be based on one or more of the following:

- an input carbon-containing gas flow rate of 100 standard cubic centimeters per minute (sccm)-5 standard liters per minute (slm);
- lower flow rates typically offer enhanced fidelity and tunability, and may therefore be conducive for accelerating carbon-based species through the reaction chamber 722 and 810, which may result in a lower doping rate of additives;
- higher flow rates typically result in higher output, but may reduce fidelity and/or directionality of the FLG nanoplatelets;
- silane and/or a silane-bearing liquid precursor such as hexamethyldisiloxane (HMDSO) or hexamethyldisilazane (HMDSN), as well as pure silane, may be flowed into the reactor 700 and 800 to provide various suitable silicon source rates. In some implementations, the silicon source rate may be one of 1-10 liters/min, 11-20 liters/min, 21-30 liters/min, 31-40 liters/min, 41-50 liters/min, 51-60 liters/min, 61-70 liters/min, 71-80 liters/min, 81-90 liters/min, 91-100 liters/min, 101-200 liters/min, or 201-530 liters/min, where higher flow rates may allow for additional corresponding additive material coating on accelerated ionized particles 716 and 816;
- lithium (Li), nickel (Ni), manganese (Mn), copper (Cu), tri-methyl aluminum (TMA), tri-methyl gallium (TMG), and sulfur (S) containing gaseous species may be flowed into the reactors 700 and 800 to provide a silicon source rate of one of 1-10 liters/min, 11-20 liters/min, 21-30 liters/min, 31-40 liters/min, 41-50 liters/min, 51-60 liters/min, 61-70 liters/min, 71-80 liters/min, 81-90 liters/min, 91-100 liters/min, 101-200 liters/min, or 201-530 liters/min, where higher flow rates may allow for a thicker coating of additives on FLG nanoplatelets;
- additives, including silica, may be flowed into reactor 700 and 800 and/or dispersed in particle form at a ratio of approximately 1%-75% of the flow rate of the methane gas;
- additives may be configured to coat and/or decorate accelerated ionized particles 760; and
- preferred chemistries for the substrate 750 may include between approximately 0.1%-5% additives and between approximately 65%-99% silica, with the remaining portion attributed to carbon-containing materials (such as the FLG nanoplatelets).

Figure 9:
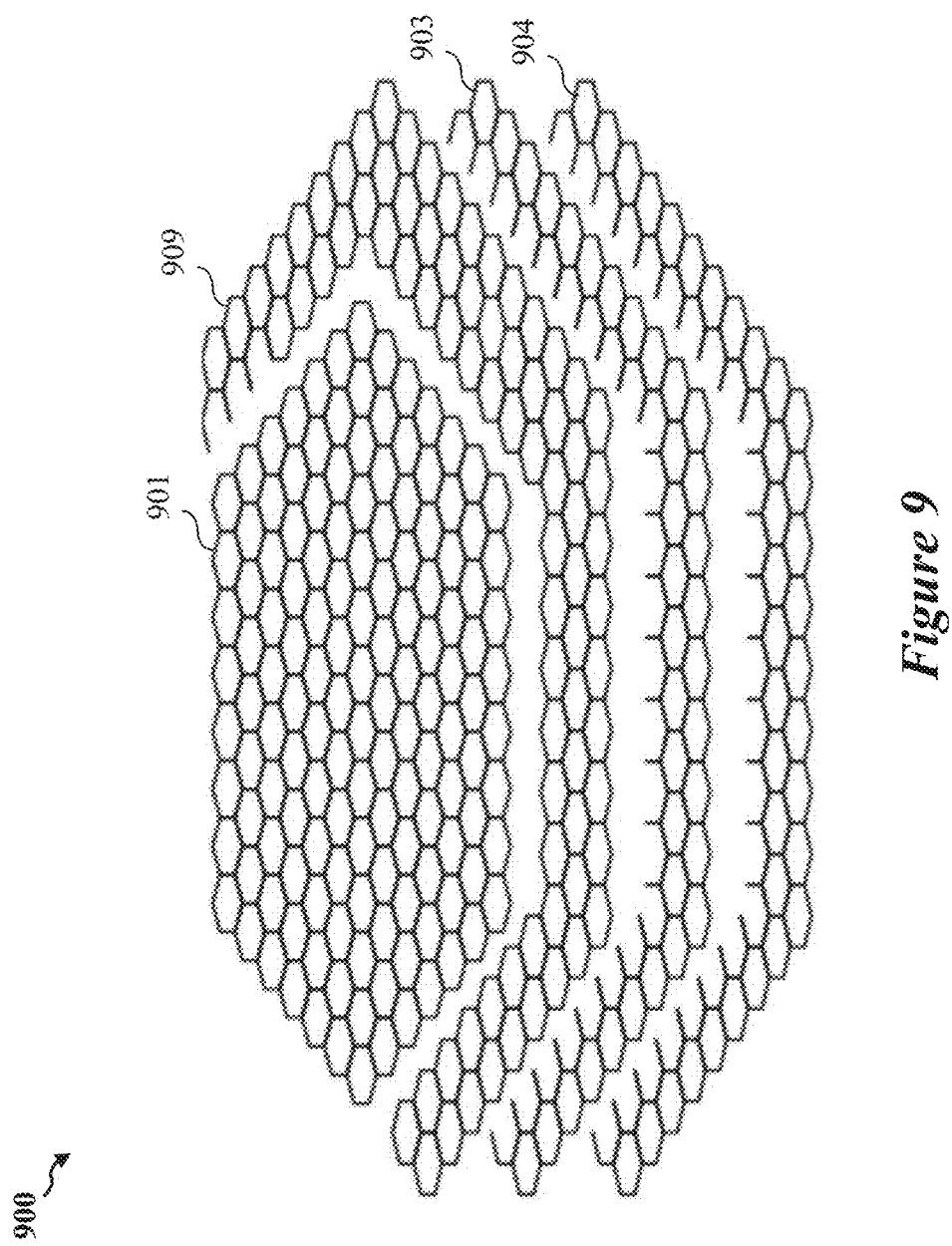
FIG. 9 shows an example few layer graphene (FLG) nanoplatelet that can be produced by the system depicted in FIG. 1, according to some implementations.

FIG. 9 shows an example FLG nanoplatelet 900, according to some implementations. The FLG nanoplatelet 900 may be produced and/or post-processed by the fluidized-bed reactor 110 of FIG. 1 to produce, for example, the post-processed particles 160. For example, the FLG nanoplatelet 900 may coalesce with additional instances of the FLG nanoplatelet 900 to produce one or more of the post-processed particles 160. In some instances, the FLG nanoplatelet 900 may have a buckled or crinkled structure in which groups of carbon-carbon bonded atoms may flex or fold in response to an external force, pressure, or load.

For the example of FIG. 9, the FLG nanoplatelet 900 is shown to include four graphene layers 901-904 stacked (such as vertically or substantially vertically) on top of one another. In other implementations, the FLG nanoplatelet 900 may include other numbers of graphene layers. The number of graphene layers in FLG nanoplatelet 900 may affect one or more properties of the FLG nanoplatelet 900. These properties may include (but are not limited to) the ability to absorb or dissipate energy, the ability to conduct electricity, and the ability to self-heal cracks formed one or more materials.

Figure 10:
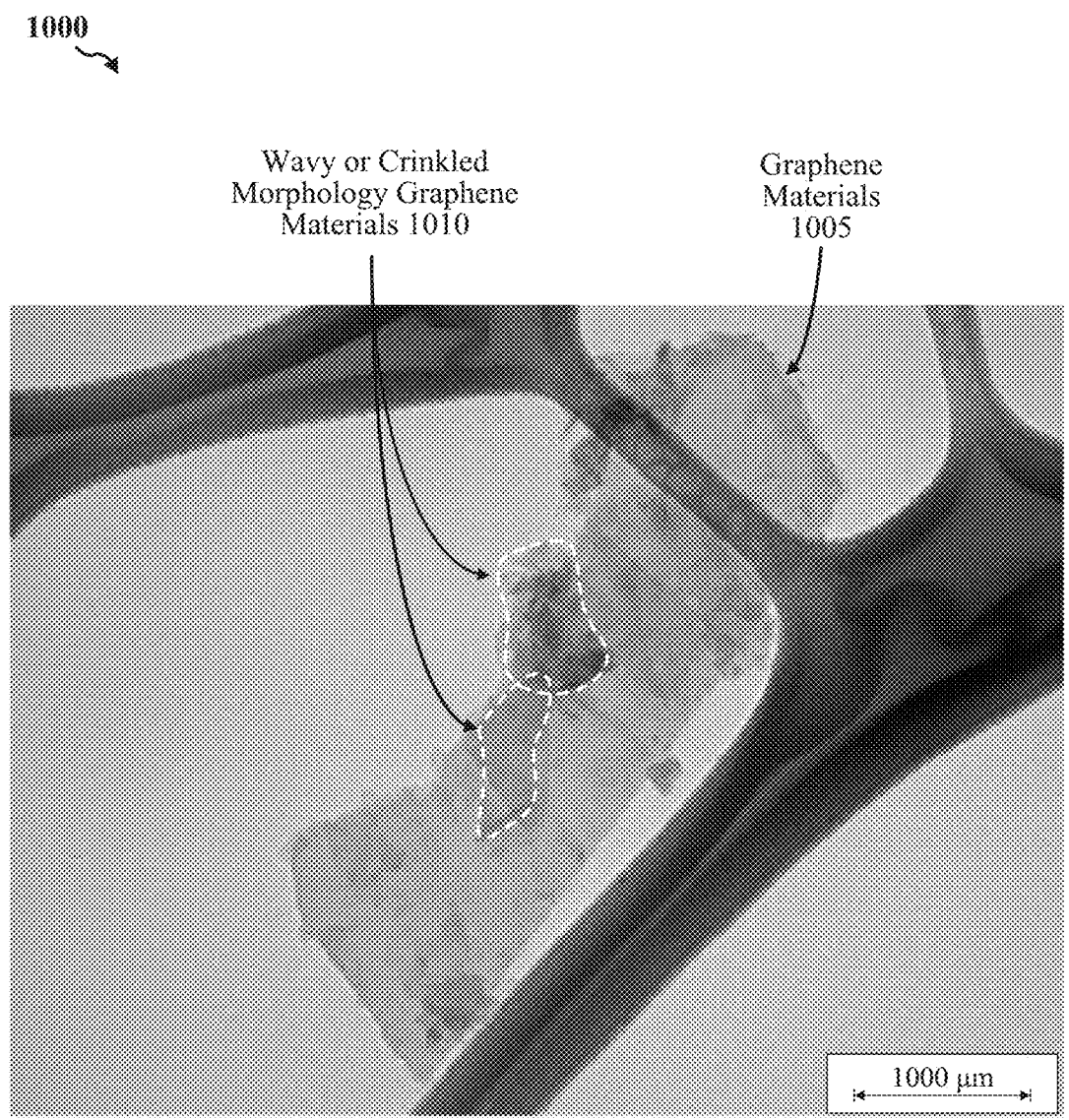
FIG. 10 shows a micrograph of graphene materials produced by sulfuric acid ($H_2SO_4$) exfoliation from graphite, according to some implementations.

FIG. 10 shows a micrograph 1000 of graphene materials 1005 produced by sulfuric acid ($H_2SO_4$) exfoliation from graphite, according to some implementations. In some aspects, at least some of the graphene materials 1005 coalesce with one or more additional instances of the graphene materials 1005 and produce at least some of the carbon nano-particulates 118 and/or the post-processed particles 160 depicted in FIG. 1. In some other aspects, a shape and/or a morphology of at least some of the graphene materials 1005 is and/or resembles a flat nanoplatelet. In addition, at least some of the graphene materials 1005 may have a "wavy" or "crinkled" morphology 1010, which may indicate that at least some flat nanoplatelets are adjoined at one or more defined angles (rather than a straight, flat, or 180° angle), which may result in a surface area to volume ratio per unit volume being relatively higher than for non-wavy or non-crinkled graphene materials.

Figure 11:
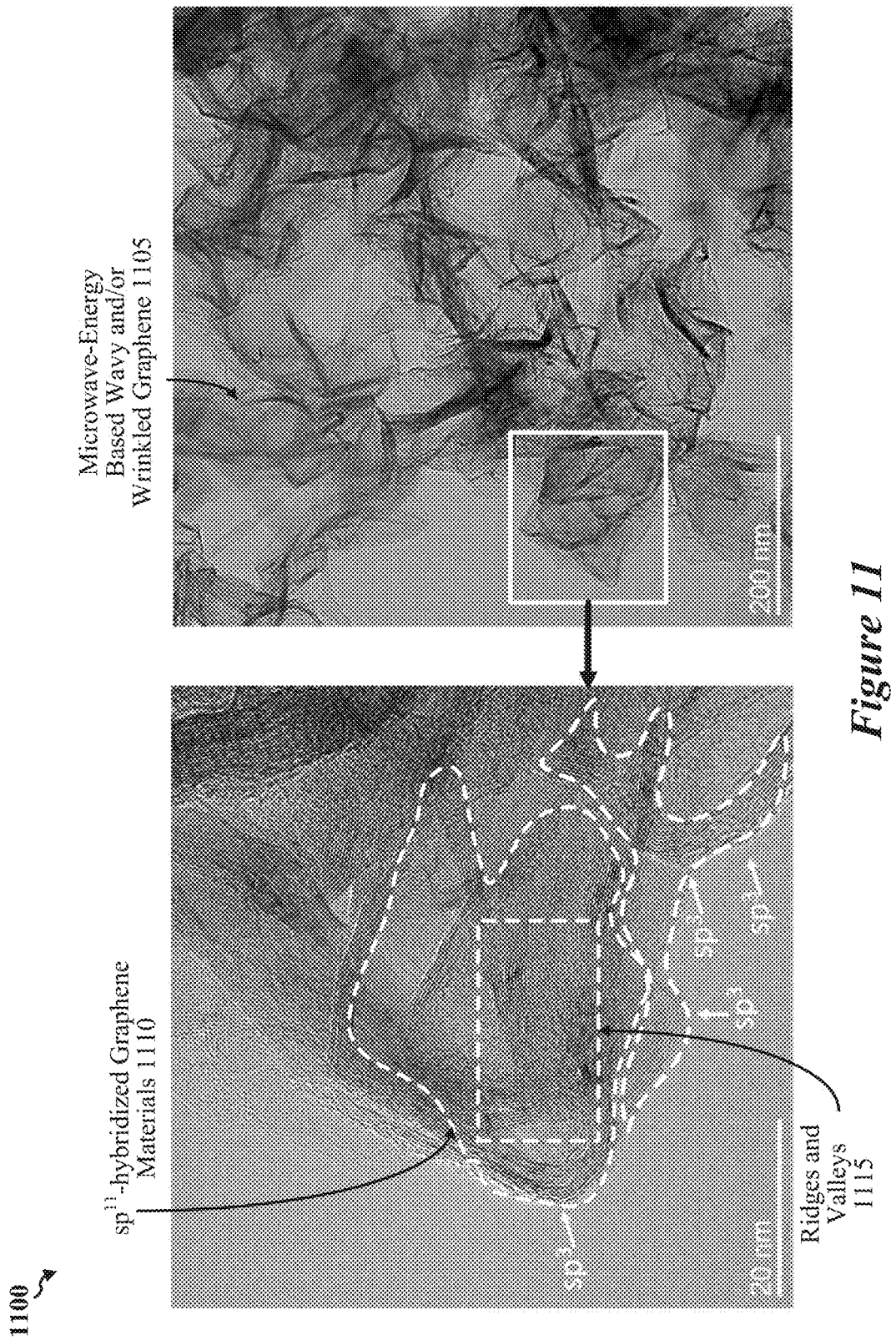
FIG. 11 shows micrographs of microwave-energy based wavy and/or wrinkled graphene, according to some implementations.

FIG. 11 shows micrographs 1100 of microwave-energy based wavy and/or wrinkled graphene 1105, according to some implementations. In some instances, at least some of the microwave-energy based wavy and/or wrinkled graphene 1105 may coalesce with one or more additional instances of itself to produce at least some of the carbon nano-particulates 118 and/or the post-processed particles 160 depicted in FIG. 1. In addition, at least some of the microwave-energy based wavy and/or wrinkled graphene 1105 may be one example of the graphene materials 1005 of FIG. 10. In some aspects, at least some graphene nanoplatelets of the microwave-energy based wavy and/or wrinkled graphene 1105 may adjoin together to define various ridges and valleys 1115. In this way, at least some of the ridges and valleys 1115 may produce areas of increased flexibility within the microwave-energy based wavy and/or wrinkled graphene 1105, which may be suitable for infiltration by, for example, a polymeric substance (e.g., PPgMA and/or the like). In some aspects, $sp^3$-hybridized polymeric chains (e.g., polyethylene, PE), may demonstrate increased flexibility relative to $sp^2$-C chain conjugated polymers (e.g., poly(p-phenylene)).

Figure 12:
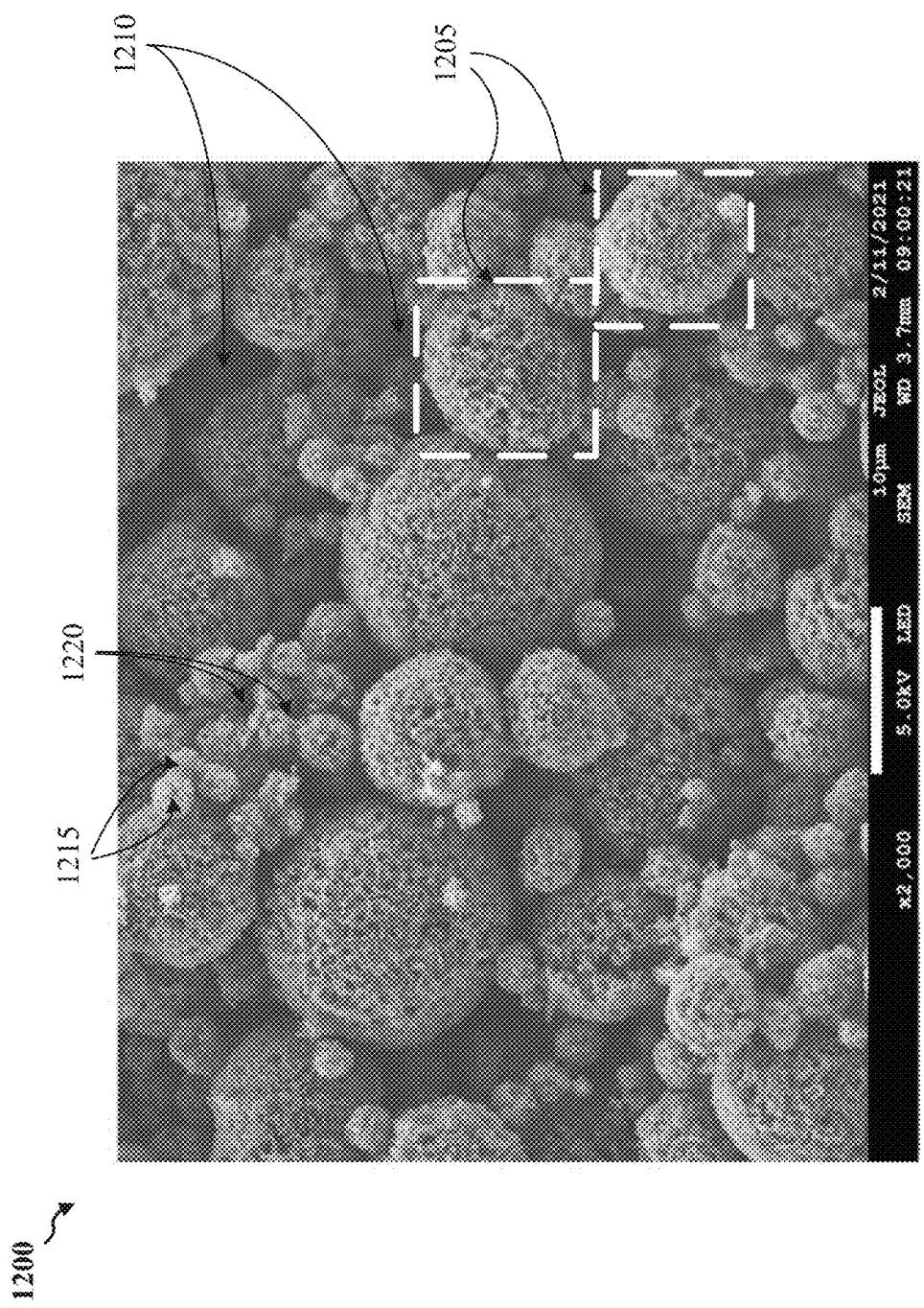
FIG. 12 shows a micrograph of example carbon particles, according to some implementations.

FIG. 12 shows a micrograph of example carbon particles 1205, according to some implementations. In some aspects, at least some of the carbon particles 1205 may each be one example of one or more of the carbon nano-particulates 118 and/or the post-processed particles 160 depicted in FIG. 1. In addition, at least some of the carbon particles 1205 may be formed upon coalescence of several instances of the graphene materials 1005 of FIG. 10 and/or the microwave-energy based wavy and/or wrinkled graphene 1105 of FIG. 11. In some instances, the carbon particles 1205 may be separated from one another by a first multitude of pores 1210 formed between adjacent instances of the carbon particles 1205. As shown in FIG. 12, each of the carbon particles 1205 may be a porous structure containing additional multitudes of pores (e.g., including a second multitude of pores 1220) produced by overlapping secondary carbon particles 1215. In various implementations, an average size of the first multitude of pores 1210 may be larger than an average size of the second multitude of pores 1220.

Figure 13A:
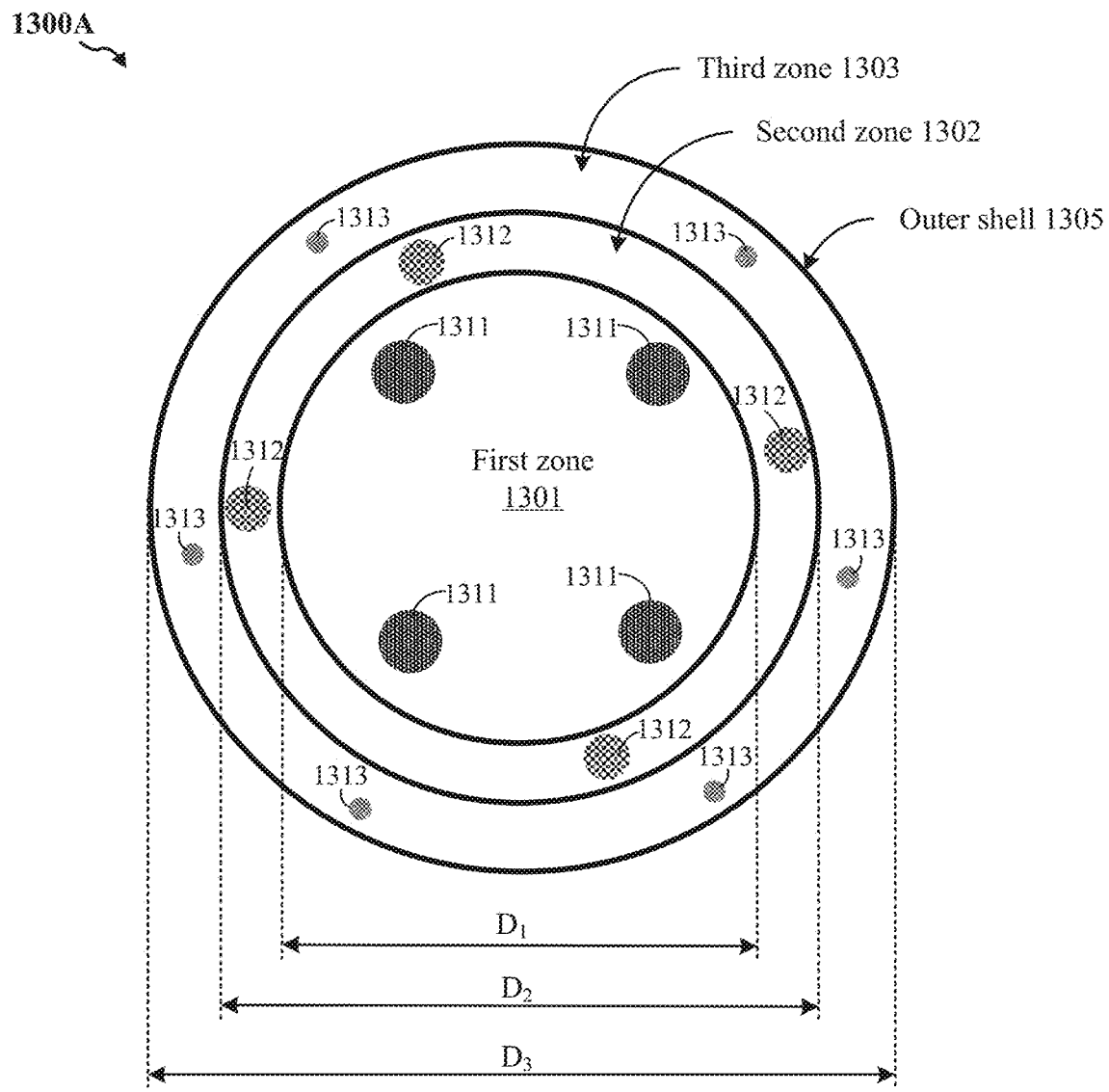
FIG. 13A shows a diagram of an example carbon particle, according to some implementations.

FIG. 13A shows a diagram of an example of a carbon particle (e.g., a tri-zone particle) shown in FIG. 12, according to some implementations. In various implementations, the tri-zone particle 1300A may be one example of any one or more of carbon nano-particulates 118 and/or the post-processed particles 160 depicted in FIG. 1. The tri-zone particle 1300A may include three discrete zones such as (but not limited to) a first zone 1301, a second zone 1302, and a third zone 1303. In some aspects, each of the zones 1301-1303 surrounds and/or encapsulates a preceding zone. For example, the first zone 1301 may be surrounded by or encapsulated by the second zone 1302, and the second zone 1302 may be surrounded by or encapsulated by the third zone 1303. The first zone 1301 may correspond to an inner region of the tri-zone particle 1300A, the second zone 1302 may correspond to an intermediate transition region of the tri-zone particle 1300A, and the third zone 1303 may correspond to an outer region of the tri-zone particle 1300A. In some aspects, the tri-zone particle 1300A may include a permeable shell 1305 that deforms in response to contact with one or more adjacent non-tri-zone particles and/or tri-zone particles 1300A.

In some implementations, the first zone 1301 may have a relatively low density, a relatively low electrical conductivity, and a relatively high porosity, the second zone 1302 may have an intermediate density, an intermediate electrical conductivity, and an intermediate porosity, and the third zone 1303 may have a relatively high density, a relatively high electrical conductivity, and a relatively low porosity. In some aspects, the first zone 1301 may have a density of carbon material between approximately 1.5 g/cc and 5.0 g/cc, the second zone 1302 may have a density of carbon material between approximately 0.5 g/cc and 3.0 g/cc, and the third zone 1303 may have a density of carbon material between approximately 0.0 and 1.5 g/cc. In other aspects, the first zone 1301 may include pores having a width between approximately 0 and 40 nm, the second zone 1302 may include pores having a width between approximately 0 and 35 nm, and the third zone 1303 may include pores having a width between approximately 0 and 30 nm. In some other implementations, the second zone 1302 may not be defined for the tri-zone particle 500A. In one implementation, the first zone 1301 may have a principal dimension $D_1$ between approximately 0 nm and 100 nm, the second zone 1302 may have a principal dimension $D_2$ between approximately 20 nm and 150 nm, and the third zone 1303 may have a principal dimension $D_3$ of approximately 200 nm.

Aspects of the present disclosure recognize that the unique layout of the tri-zone particle 1300A and the relative dimensions, porosities, and electrical conductivities of the first zone 1301, the second zone 1302, and the third zone 1303 can be selected and/or modified achieve a desired balance between minimizing the polysulfide shuttle effect and maximizing the specific capacity of a host battery. Specifically, in some aspects, the pores may decrease in size and volume from one zone to other. In some implementations, the tri-zone particle may consist entirely of one zone with a range of pore sizes and pores distributions (e.g., pore density). For the example of FIG. 13B, the pores 1311 associated with the first zone 1301 or the first porosity region have relatively large widths and may be defined as macropores, the pores 1312 associated with the second zone 1302 or the second porosity region have intermediate-sized widths and may be defined as mesopores, and the pores 1313 associated with the third zone 1303 or the third porosity region have relatively small widths and may be defined as micropores.

A group of tri-zone particles 1300A may be joined together to form an aggregate (not shown for simplicity), and a group of the aggregates may be joined together to form an agglomerate (not shown for simplicity). In some implementations, a plurality of mesopores may be interspersed throughout the aggregates formed by respective groups of the tri-zone particles 1300A. In some aspects, the first porosity region 1311 may be at least partially encapsulated by the second porosity region 1312 such that a respective aggregate may include one or more mesopores and one or more macropores. In one implementation, each mesopore may have a principal dimension between 3.3 nanometers (nm) and 19.3 nm, and each macropore may have a principal dimension between 0.1 µm and 1,000 µm. In some instances, the tri-zone particle 1300A may include carbon fragments intertwined with each other and separated from one another by at least some of the mesopores.

In some implementations, the tri-zone particle 1300A may include a surfactant or a polymer that includes one or more of styrene butadiene rubber, polyvinylidene fluoride, poly acrylic acid, carboxyl methyl cellulose, polyvinylpyrrolidone, and/or polyvinyl acetate that can act as a binder to join a group of the carbon materials together. In other implementations, the tri-zone particle 1300A may include a gel-phase electrolyte or a solid-phase electrolyte disposed within at least some of the pores.

In some implementations, the tri-zone particle 1300A may have a surface area of exposed carbon surfaces in an approximate range between 10 $m^2/g$ to 3,000 $m^2/g$ and/or a composite surface area in an approximate range between 10 $m^2/g$ to 3,000 $m^2/g$. In one implementation, a composition of matter including a multitude of tri-zone particles 1300A may have an electrical conductivity in an approximate range between 100 S/m to 20,000 S/m at a pressure of 12,000 pounds per square in (psi) and a sulfur to carbon weight ratio between approximately 1:5 to 10:1.

Figure 13B:
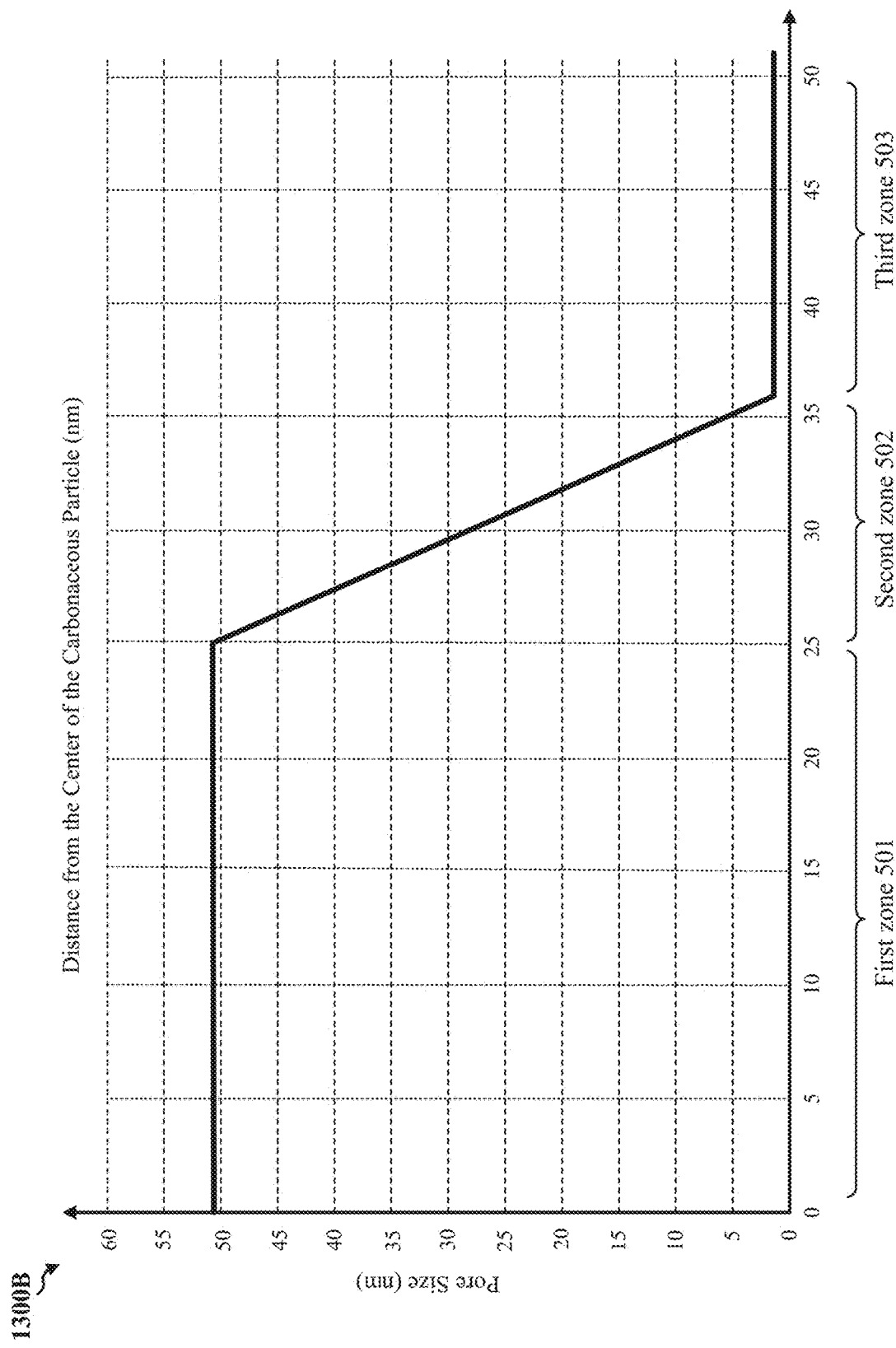
FIG. 13B shows an example step function representative of the example carbon particle of FIG. 5A, according to some implementations.

FIG. 13B shows an example step function representative of the tri-zone particle of FIG. 13A, according to some implementations. As discussed, the pores distributed throughout the tri-zone particle 1300A may have different sizes, volumes, or distributions. In some implementations, the average pore volume may decrease based on a distance between a center of the tri-zone particle 1300A and an adjacent zonae, for example, such that pores associated with the first zone 1301 or the first porosity region have a relatively large volume or pore size, pores associated with the second zone 1302 or the second porosity region have an intermediate volume, and pores associated with the third zone 1303 or the third porosity region have a relatively small volume. The interior region has a higher pore volume than the regions near the periphery. The region with higher pore volume provides for high sulfur loading whereas the lower pore volume outer regions mitigate the migration of polysulfides during cell cycling. In the example of FIG. 8C, the average pore volume in the inner region is approximately 3 $^{cc}/g$, the average pore volume in the outermost region is approximately 0.5 $^{cc}/g$ and the average pore volume in the intermediate region is between 0.5 $^{cc}/g$ and 3 $^{cc}/g$.

Figure 14:
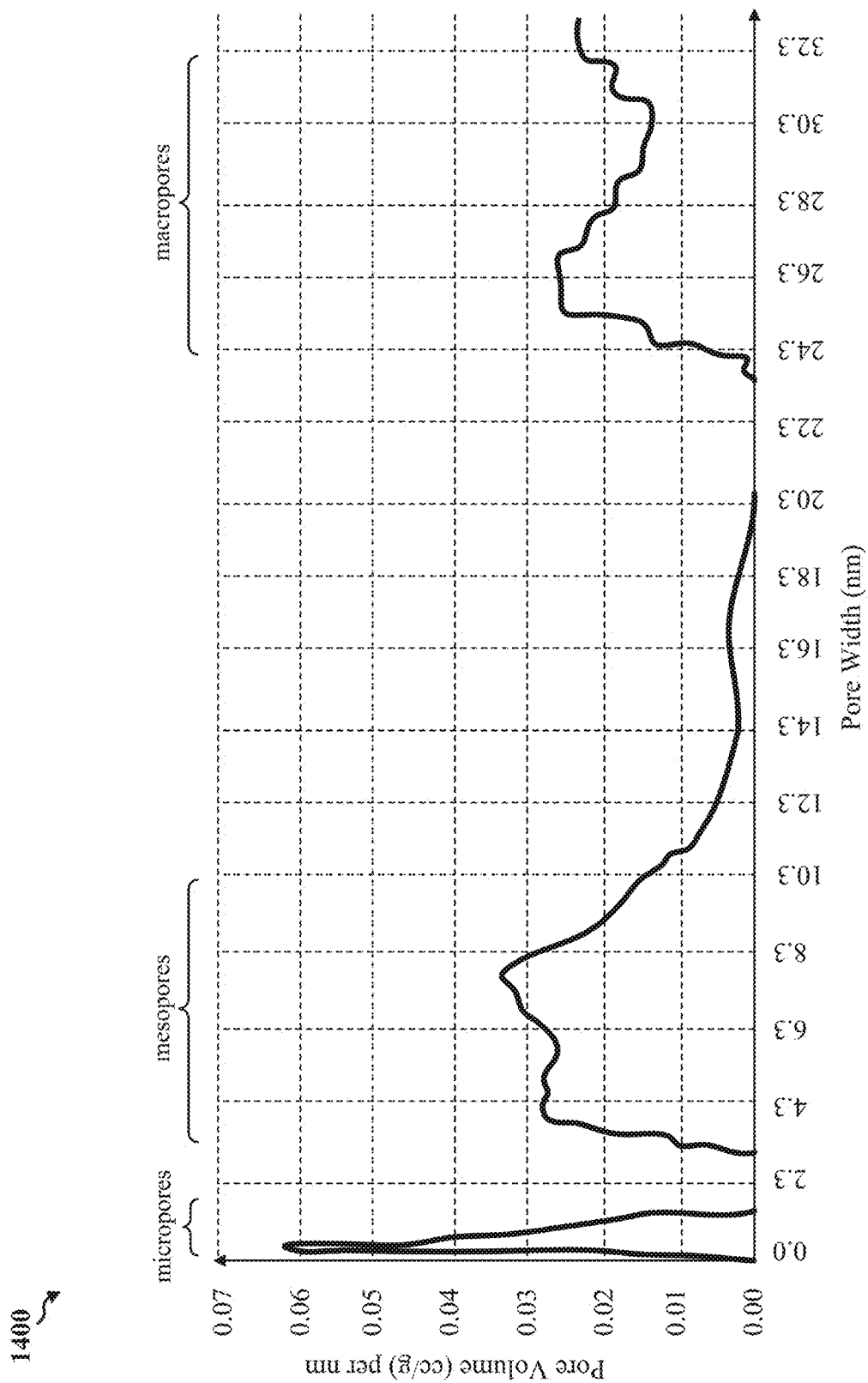
FIG. 14 shows a graph depicting an example distribution of pore volume versus pore width of an example carbon particle, according to some implementations.

FIG. 14 shows a graph 1400 depicting an example distribution of pore volume versus pore width of an example carbon particle, according to some implementations. In some instances, the example carbon particles may be one of the carbon nano-particulates 118 and/or the post-processed particles 160 depicted in FIG. 1. As depicted in the graph 1400, pores associated with a relatively high pore volume may have a relatively low pore width, for example, such that the pore width generally increases as the pore volume decreases. In some aspects, pores having a pore width less than approximately 1.0 nm may be referred to as micropores, pores having a pore width between approximately 3 and 11 nm may be referred to as mesopores, and pores having a pore width greater than approximately 24 nm may be referred to as macropores.

Figures 15A, 15B:
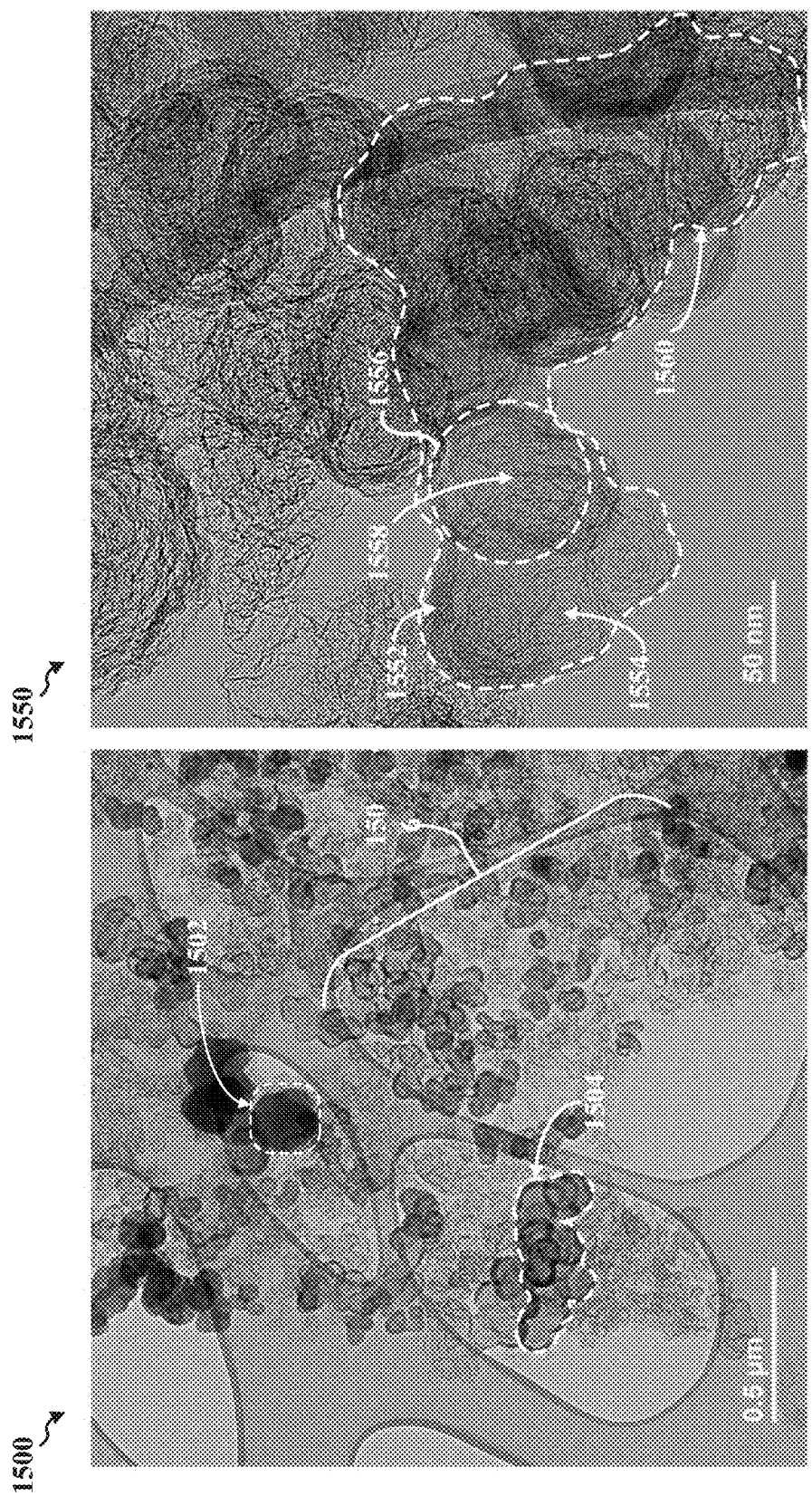
FIG. 15A shows a micrograph of example carbon particles, aggregates, and/or agglomerates, according to some implementations.
FIG. 15B shows a micrograph of example carbon particles, aggregates, and/or agglomerates, according to some implementations.

FIG. 15A shows a show micrographs of example carbon particles, aggregates, and/or agglomerates depicted in FIG. 12 and/or FIG. 13A, according to some implementations. In some aspects, the carbon particles depicted in FIG. 15A may be one example of carbon nano-particulates 118 and/or the post-processed particles 160 depicted in FIG. 1. In some implementations, each of the carbon structures 1502 may have a substantially hollow a core region surrounded by various monolithic carbon growths and/or layering. In some aspects, the monolithic carbon growths and/or layering may be examples of the various carbon structures, growths and/or layering. In some instances, the carbon structures 1502 may include several concentric multi-layered fullerenes and/or similarly shaped carbon structures organized at varying levels of density and/or concentration. For example, the actual final shape, size, and graphene configuration of each of the carbon structures 1502 may depend on various manufacturing processes. The carbon structures 1502 may, in some aspects, demonstrate poor water solubility. As such, in some implementations, non-covalent functionalization may be utilized to alter one or more dispersibility properties of the carbon structures 1502 without affecting the intrinsic properties of the underlying carbon nanomaterial. In some aspects, the underlying carbon nanomaterial may be formative a $sp^2$ carbon nanomaterial. In some implementations, each of the carbon structures 1502 may have a diameter between approximately 20 and 500 nm. In various implementations, groups of the carbon structures 1502 may coalesce and/or join together to form the aggregates 1504. In addition, groups of the aggregates 1504 may coalesce and/or join together to form the agglomerates 1506. In some aspects, one or more of the carbon structures 1502, the aggregates 1504, and/or the agglomerates 1506 may be used to form one or more of the carbon nano-particulates 118 and/or the post-processed particles 160 depicted in FIG. 1.

FIG. 15B shows a micrograph 1550 of an aggregate formed of carbon material, according to some implementations. In some implementations, the aggregate 1560 may be an example of one of the aggregates 1504 of FIG. 15A. In one implementation, exterior carbon shell-type structures 1552 may fuse together with carbons provided by other carbon shell-type structures 1554 to form a carbon structure 1556. A group of the carbon structures 1556 may coalesce and/or join with one another to form the aggregate 1560. In some aspects, a core region 1558 of each of the carbon structures 1556 may be tunable, for example, in that the core region 1558 may include various defined concentration levels of interconnected graphene structures and/or carbon particles, as described with reference to FIG. 5A and/or FIG. 5B. In some implementations, some of the carbon structures 1556 may have a first concentration of interconnected carbons approximately between 0.1 g/cc and 2.3 g/cc at or near the exterior carbon shell-type structure 1552. Each of the carbon structures 1556 may have pores to transport lithium cations ($Li^+$) extending inwardly from toward the core region 1558.

In some implementations, the pores in each of the carbon structures 1556 may have a width or dimension between approximately 0.0 nm and 0.5 nm, between approximately 0.0 and 0.1 nm, between approximately 0.0 and 6.0 nm, or between approximately 0.0 and 35 nm. Each carbon structures 1556 may also have a second concentration at or near the core region 1558 that is different than the first concentration. For example, the second concentration may include several relatively lower-density carbon regions arranged concentrically. In one implementation, the second concentration may be lower than the first concentration at between approximately 0.0 g/cc and 1.0 g/cc or between approximately 1.0 g/cc and 1.5 g/cc. In some aspects, the relationship between the first concentration and the second concentration may be used to achieve a balance between confining sulfur or polysulfides within a respective electrode and maximizing the transport of lithium cations ($Li^+$). For example, sulfur and/or polysulfides may travel through the first concentration and be at least temporarily confined within and/or interspersed throughout the second concentration during operational cycling of a lithium-sulfur battery.

In some implementations, at least some of the carbon structures 1556 may include CNO oxides organized as a monolithic and/or interconnected growths and be produced in a thermal reactor. For example, the carbon structures 1556 may be decorated with cobalt nanoparticles according to the following example recipe: cobalt(II) acetate ($C_4H_6CoO_4$), the cobalt salt of acetic acid (often found as tetrahydrate $Co(CH_3CO_2)_2 \cdot \rightarrow H_2O$, which may be abbreviated as $Co(Oac)_2 \cdot 4H_2O$, may be flowed into the thermal reactor at a ratio of approximately 59.60 wt % corresponding to 40.40 wt % carbon (referring to cobalt in CNO form), resulting in the functionalization of active sites on the CNO oxides with cobalt, showing cobalt-decorated CNOs at a 15,000× level, respectively. In some implementations, suitable gas mixtures used to produce Carbon #29 and/or the cobalt-decorated CNOs may include the following steps:

Ar purge 0.75 standard cubic feet per minute (scfm) for 30 min;
Ar purge changed to 0.25 scfm for run;
temperature increase: 25° C. to 300° C. 20 mins; and
temperature increase: 300° C.-500° C. 15 mins.

Carbon materials described with reference to FIGS. 15A and 15B may include or otherwise be formed from one or more instances of graphene, which may include a single layer of carbon atoms with each atom bound to three neighbors in a honeycomb structure. The single layer may be a discrete material restricted in one dimension, such as within or at a surface of a condensed phase. For example, graphene may grow outwardly only in the x and y planes (and not in the z plane). In this way, graphene may be a two-dimensional (2D) material, including one or several layers with the atoms in each layer strongly bonded (such as by a plurality of carbon-carbon bonds) to neighboring atoms in the same layer.

In some implementations, graphene nanoplatelets (e.g., formative structures included in each of the carbon structures 1556) may include multiple instances of graphene, such as a first graphene layer, a second graphene layer, and a third graphene layer, all stacked on top of each other in a vertical direction. Each of the graphene nanoplatelets, which may be referred to as a GNP, may have a thickness between 1 nm and 3 nm, and may have lateral dimensions ranging from approximately 100 nm to 100 μm. In some implementations, graphene nanoplatelets may be produced by multiple plasma spray torches arranged sequentially by roll-to-roll ("R2R") production. In some aspects, R2R production may include deposition upon a continuous substrate that is processed as a rolled sheet, including transfer of 2D material(s) to a separate substrate. In some instances, the plasma spray torches used in the described R2R processes may spray carbon materials at different concentration levels to produce specific concentration levels of graphene nanoplatelets. Therefore, R2R processes may provide a fine level of tunability for producing the carbon nano-particulates 118 and/or the post-processed particles 160 depicted in FIG. 1, and/or other carbon particles as described elsewhere in the present disclosure.

Figure 16:
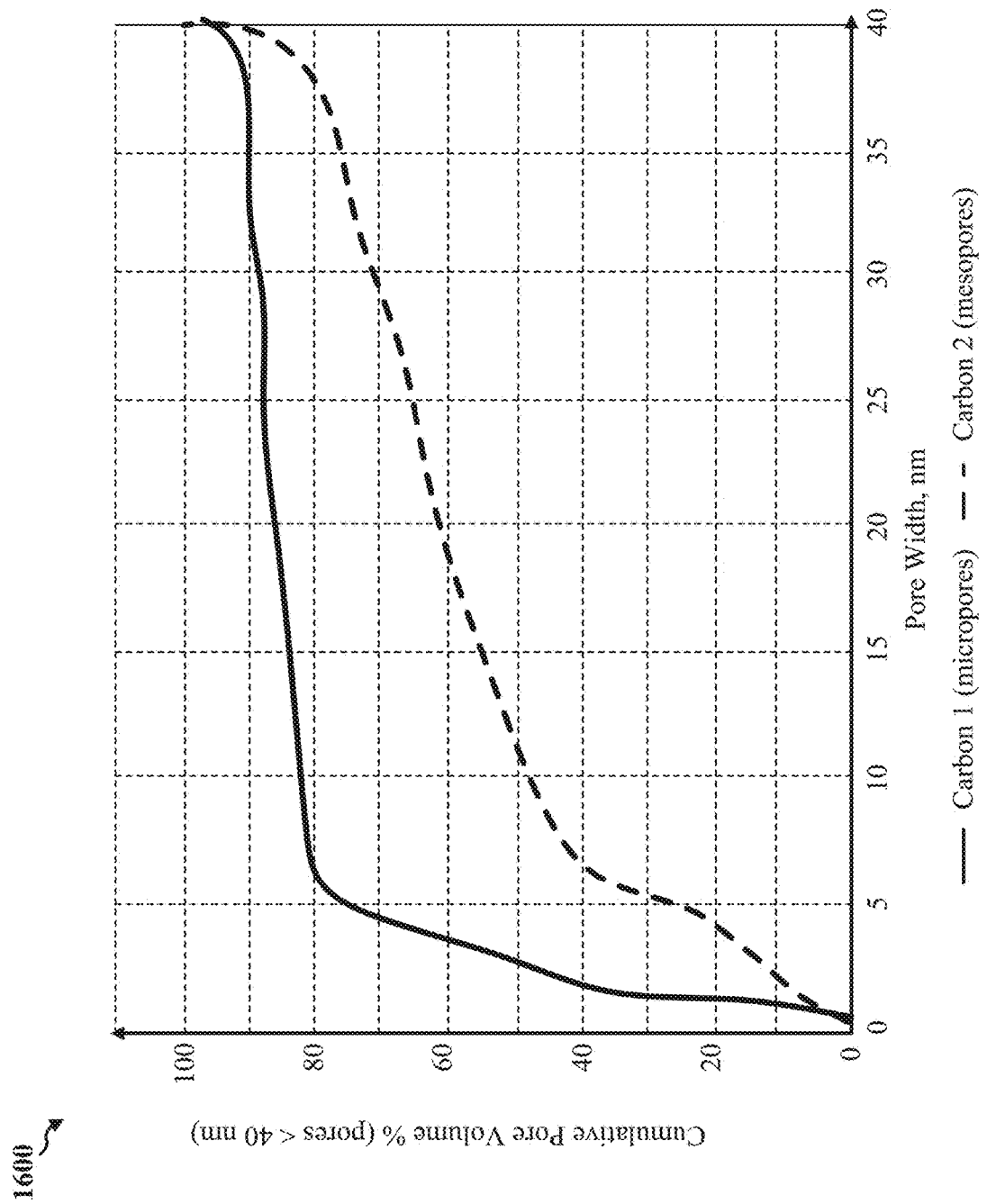
FIG. 16 shows a graph depicting cumulative pore volume versus pore width for micropores and mesopores dispersed throughout example carbon particles, according to some implementations.

FIG. 16 shows a graph 1600 depicting cumulative pore volume versus pore width for micropores and mesopores dispersed throughout the carbon particles 1205 depicted in the micrograph 1200 of FIG. 12, according to some implementations. As used herein, "Carbon 1" refers to structured carbon materials including mostly micropores (such as less than 5 nm in principal dimension), and "Carbon 2" refers to structured carbon materials including mostly mesopores (such as between approximately 20 nm to 50 nm in principal dimension). In some implementations, an electrode suitable for use in one of the batteries disclosed herein may be prepared to have the pore size versus pore distribution depicted in the graph 1600.

Figure 17:
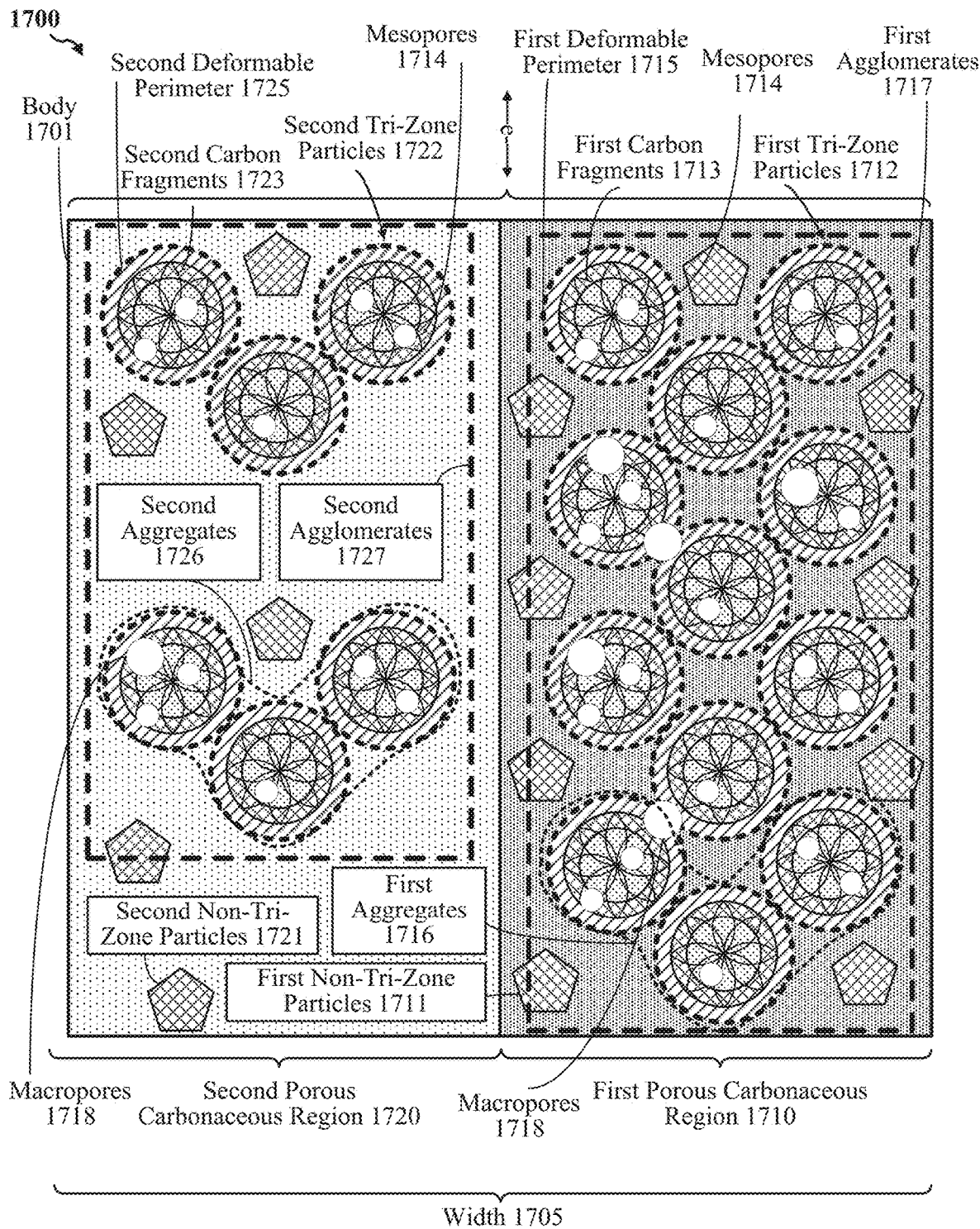
FIG. 17 shows an example configuration of example carbon particles, according to some implementations.

FIG. 17 shows an example configuration 1700 of the example carbon particles depicted in FIG. 12, according to some implementations. In some implementations, the configuration 1700 may be one example of one or more of the carbon nano-particulates 118 and/or the post-processed particles 160 depicted in FIG. 1. The configuration 1700 may be suitable for usage in production of, for example, carbon-based battery cathodes, such as a carbon scaffold for incorporation in lithium-sulfur batteries. In one implementation, the configuration 1700 includes a first porous carbon region 1710 and a second porous carbon region 1720 positioned adjacent to the first porous carbon region 1710. The first porous carbon region 1710 may be formed of a first concentration level of carbon materials, and the second porous carbon region 1720 formed of a second concentration level of carbon materials dissimilar to the first concentration level of carbon materials. For example, the second porous carbon region 1720 may have a lower concentration level of carbon materials than the first porous carbon region 1710 as shown in FIG. 17. In some aspects, additional porous carbon regions (not shown in FIG. 9 for simplicity) maybe coupled with at least the second porous carbon region 1720.

Specifically, these additional porous carbon regions may be arranged in order of incrementally decreasing concentration levels of carbon materials in a direction away from the first porous carbon region 1710 to provide for complete tunability. That is, in one implementation, the second porous carbon region 1720 may face a desired region (and the first porous carbon region 1710 of the configuration 1700 may be positioned pursuant to customer specifications. In this way, denser carbon regions, such as the first porous carbon region 1710, may facilitate relatively low levels of substance between adjacent contact points of carbon materials, while sparser carbon regions, such as the second porous carbon region 1720, may facilitate relatively high levels of substance infiltration. In some implementations, additional carbon regions coupled with and positioned adjacent to the second porous carbon region 1720 may have a lower density of carbon materials than the second porous carbon region 1720. In this way, the additional carbon regions of lower density may accommodate higher levels of lithium ion transport to, for example, permit for tuning of various performance characteristics of composite materials including the configuration 1700.

In one implementation, the first porous carbon region 1710 may include first non-tri-zone particles 1711. The configuration of the first non-tri-zone particles 1711 within the first porous carbon region is one example configuration. Other placements, orientations, alignments and/or the like are possible for the non-tri-zone particles. In some aspects, each non-tri-zone particle may be an example of one or more carbon materials disclosed elsewhere in the present disclosure. The first porous carbon region 1710 may also include first tri-zone particles 1712 interspersed throughout the first non-tri-zone particles 1711 as shown in FIG. 17, or positioned in any other placement, orientation, or configuration. Each first tri-zone particle 1712 may be one example of the tri-zone particle 1300A of FIG. 13A. In addition, or the alternative, each first tri-zone-particle 1712 may include first carbon fragments 1713 intertwined with each other and separated from one another by mesopores 1714. Each tri-zone-particle may have a first deformable perimeter 1715 configured to coalesce with adjacent first non-tri-zone particles 1711 and/or first tri-zone particles 1712.

The first porous carbon region 1710 may also include first aggregates 1716, where each aggregate includes a multitude of the first tri-zone particles 1712 joined together. In one or more particular examples, each first aggregate may have a principal dimension in a range between 10 nanometers (nm) and 10 micrometers (μm). The mesopores 914 may be interspersed throughout the first plurality of aggregates, where each mesopore has a principal dimension between 3.3 nanometers (nm) and 19.3 nm. In addition, the first porous carbon region 910 may include first agglomerates 917, where each agglomerate includes a multitude of the first aggregates 916 joined to each other. In some aspects, each first agglomerate 917 may have a principal dimension in an approximate range between 0.1 μm and 1,000 μm. Macropores 918 may be interspersed throughout the first aggregates 916, where each macropore may have a principal dimension between 0.1 μm and 1,000 μm. In some implementations, one or more of the above-discussed carbon materials, allotropes and/or structures may be one or more examples of that shown in FIGS. 15A and 15B.

The second porous carbon may include second non-tri-zone particles 1721, which may be one example of the first non-tri-zone particles 1711. The second porous carbon region 1720 may include second tri-zone particles 1722, which may each be one example of each of the first tri-zone particles 1712 and/or may be one example of the tri-zone particle 1300A of FIG. 13A. In addition, or the alternative, each second tri-zone particle 1322 may include second carbon fragments 1323 intertwined with each other and separated from one another by the mesopores 1714. Each second tri-zone particle 1722 may have a second deformable perimeter 1725 configured to coalesce with one or more adjacent second non-tri-zone particles 1721 or second tri-zone particles 1722.

In addition, the second porous carbon region 1720 may include second aggregates 1726, where each second aggregate 1726 may include a multitude of the second tri-zone particles 1722 joined together. In one or more particular examples, each second aggregate 1726 may have a principal dimension in a range between 10 nanometers (nm) and 10 micrometers (μm). The mesopores 1714 may be interspersed throughout the second aggregates 1726, each mesopore may have a principal dimension between 3.3 nanometers (nm) and 19.3 nm. Further, the second porous carbon region 1720 may include second agglomerates 1727, each second agglomerate 1727 may include a multitude of the second aggregates 1726 joined to each other, where each agglomerate may have a principal dimension in an approximate range between 0.1 μm and 1,000 μm. The macropores 918 may be interspersed throughout the second plurality of aggregates, where each macropore having a principal dimension between 0.1 μm and 1,000 μm. In some implementations, one or more of the above-discussed carbon materials, allotropes and/or structures may be one or more examples of that shown in FIGS. 17A and 17B.

In one implementation, the first porous carbon region 1710 and/or the second porous carbon region 1720 may include a selectively permeable shell (not shown in FIG. 9 for simplicity), which may form a separated liquid phase on the first porous carbon region 910 or the second porous carbon region 1720, respectively. An electrolyte, such as any of the electrolytes disclosed in the present disclosure, may be dispersed within the first porous carbon region and/or the second porous carbon region for lithium ion transport associated with lithium-sulfur battery discharge-charge operational cycling.

In one or more particular examples, the first porous carbon region 1710 may have an electrical conductivity in an approximate range between 500 S/m to 20,000 S/m at a pressure of 12,000 pounds per square in (psi). The second porous carbon region 920 may have an electrical conductivity in an approximate range between 0 S/m to 500 S/m at a pressure of 12,000 pounds per square in (psi). The first agglomerates 1717 and/or second agglomerates 1727 may include aggregates connected to each other with one or more polymer-based binders.

In some aspects, each first tri-zone particle 1712 may have a first porosity region (not shown in FIG. 17 for simplicity) located around a center of the first tri-zone particle 1712. Similarly, each second tri-zone particle 1722 may have a first porosity region (not shown in FIG. 17 for simplicity) located around a center of the second tri-zone particle 99. The first porosity region may include first pores. A second porosity region (not shown in FIG. 17 for simplicity) may surround the first porosity region. The second porosity region may include second pores. In one implementation, the first pores may define a first pore density, and the second pores may define a second pore density that is different the first pore density.

In some aspects, the mesopores 1714 may be grouped into first mesopores and second mesopores (both not shown in FIG. 17 for simplicity). In one or more particular examples, the first mesopores may have a first mesopore density, and the second mesopores may have a second mesopore density that is different than the first mesopore density. In addition, the macropores 1718 may be grouped into first macropores that may have a first pore density, and second macropores (both not shown in FIG. 17 for simplicity) that may have a second pore density different than the first pore density.

Figure 18:
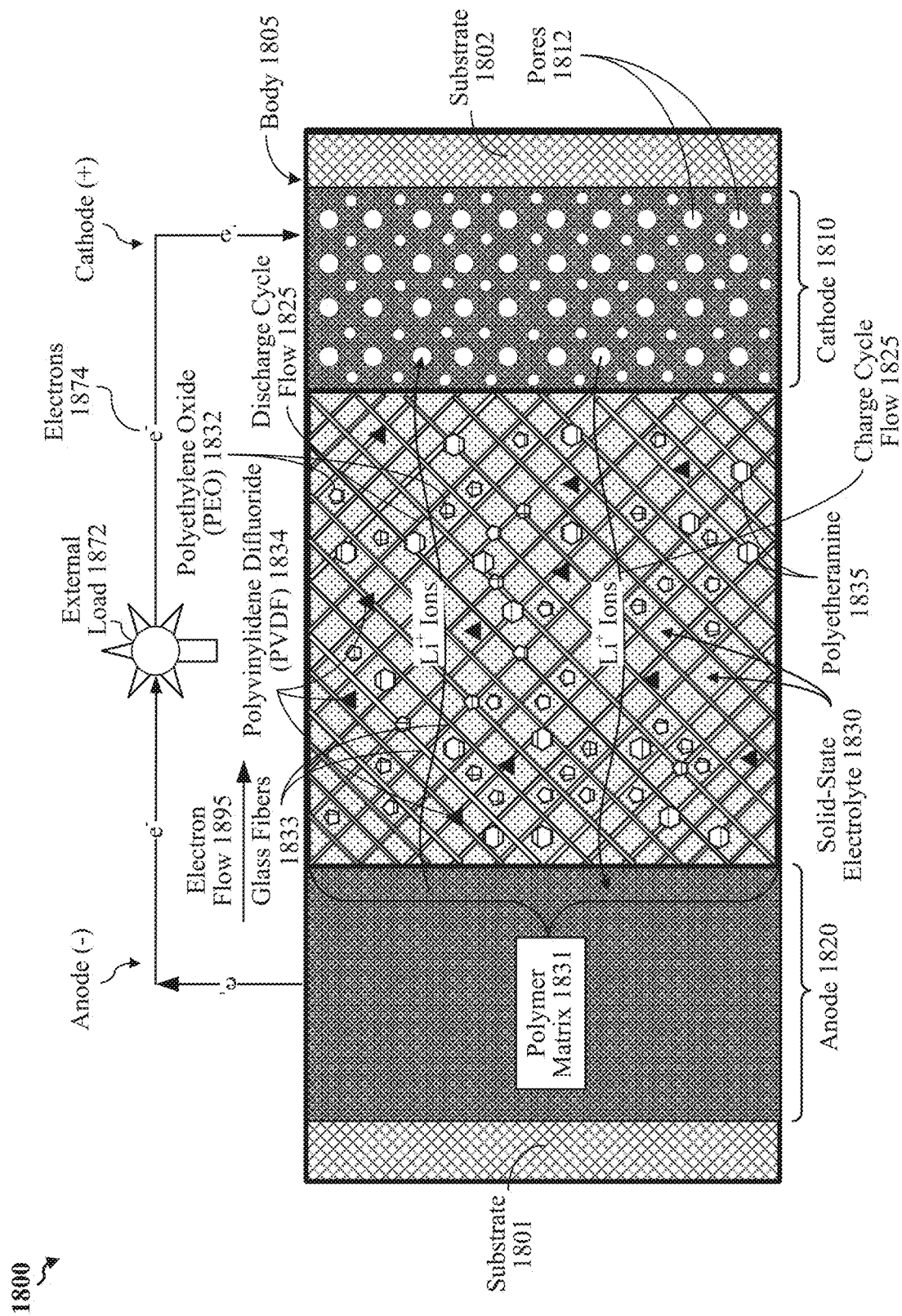
FIG. 18 shows a diagram depicting an example battery, according to some implementations.

FIG. 18 shows an example battery 1800, according to some implementations. In one implementation, the battery 1800 may be implemented as a lithium-sulfur battery, and may include an anode 1820 (e.g., an anode active material including a foil of lithium), a cathode 1810, and a solid-state electrolyte 1830. In some instances, the solid-state electrolyte 1830 may replace one or more electrolyte solution compositions presented in Examples 1-20. In some aspects, the cathode 1810 may be loaded with elemental sulfur of 3 milligrams (mg) per cubic centimeter ($cm^3$). In other aspects, the cathode 1810 may be loaded with other concentrations of elemental sulfur of 3 milligrams (mg) per cubic centimeter ($cm^3$) suitable for maximizing the efficiency of discharge-charge cycling of the battery 1800. In some aspects, the cathode 1810 may be porous and formed from a composition of matter (not shown in FIG. 18 for simplicity) including a plurality of pores 1812. The composition of matter may be one example of various carbonaceous materials and/or structures disclosed herein.

The solid-state electrolyte 1830 may be dispersed throughout at least the pores 1812 of the cathode 1810, and may also be in contact with the anode 1820. In some aspects, the solid-state electrolyte 1830 may be formed as a membrane and thereby provide ionic conduction capabilities associated with a separator. In one implementation, the solid-state electrolyte 1830 may be formed from and/or include a polymer matrix 1831, which may be formed of glass fibers 1833 interconnected with each other. In some aspects, the polymer matrix 1831 may have an ionic conductivity (e.g., conducting lithium cations ($Li^+$)) and may include between 8 weight percent (wt. %) and 12 wt. % of polyethylene oxide (PEO) 1832, between 13 wt. % and 17 wt. % of polyvinylidene difluoride (PVDF) 1834, between 3 wt. % and 7 wt. % of polyetheramine 2535 having repeated oxypropylene units (not shown in FIG. 18 for simplicity) in its backbone, and between 5 wt. % and 10 wt. % of one or more lithium-containing salts including one or more of lithium bis(trifluoromethanesulfonyl)imide (LiTFSI) or lithium iodide (LiI) (not shown in FIG. 18 for simplicity). In some implementations, at least some of the lithium-containing salts may dissociate into lithium cations ($Li^+$) and thereby assist in lithium ionic transport between the anode 1820 and the cathode 1810 during operational discharge-charge cycling of the battery 1800.

In some instances, the battery 1800 may generate undesirable lithium-containing polysulfide species (not shown in FIG. 18 for simplicity) during operational discharge-charge cycling of the battery 1800. In some instances, the cathode 1810 may at least partially trap and/or retain the lithium-containing polysulfide species, thereby preventing blockage of lithium transport pathways (e.g., as shown as a charge cycle flow 1825) within the solid-state electrolyte 1830. In some aspects, the anode 1820 may be formed as a layer of lithium that provides lithium cations ($Li^+$) upon activation of the battery 1800. In this way, the layer of lithium may provide lithium cations ($Li^+$) during operational discharge-charge cycling of the battery 1800. In other aspects, the cavity 1822 may receive lithium deposits from the cathode 1810 during operational charge cycling of the battery 1800. That is, lithium cations ($Li^+$) may travel along the charge cycling flow 1824 from the cathode 1810 to the cavity 1822 as may be associated with the return of the electrons 1874 back towards the battery 1800 as may be encountered in or associated with battery charge and/or recharge cycling. In this way, the cavity 1822 may transform into the anode 1820, which may be capable of again providing lithium cations ($Li^+$) to their respective electrochemically favored positions in the cathode 1810 during operational discharge cycling of the battery 1800.

In one implementation, the composition of matter used to form the cathode 1810 may be formed from and/or include one or more non-tri-zone particles, tri-zone particles, aggregates, or agglomerates as disclosed herein. In some aspects, each tri-zone particle used in the cathode 1810 may include carbon fragments intertwined with each other. At least some carbon fragments may be separated from one another by mesopores. A deformable perimeter may be defined upon coalescence of one or more adjacent non-tri-zone particles or tri-zone particles. Each aggregate may include a multitude of the tri-zone particles joined together and have a principal dimension in a range between 10 nanometers (nm) and 10 micrometers ($\mu m$). Mesopores may be interspersed throughout the aggregates. Each mesopore may have a principal dimension between 3.3 nanometers (nm) and 19.3 nm. Each agglomerate may be formed from a multitude of the aggregates joined to each other and have a principal dimension in an approximate range between 0.1 $\mu m$ and 1,000 $\mu m$. Macropores may be interspersed throughout the aggregates, where each macropore having a principal dimension between 0.1 $\mu m$ and 1,000 $\mu m$.

In some implementations, the ionic conductivity of the solid-state electrolyte 1830, when formed and/or deposited as a membrane (not shown in FIG. 18 for simplicity) on the anode 1820, may be based on relative concentration levels of one or more lithium-containing salts doped into the polymer matrix 1831. In this way, the ionic conductivity of the solid-state electrolyte 1830 may be between $0.97 \times 10^{-3}$ siemens per meter (S/m) and $1.03 \times 10^{-3}$ S/m at a temperature between 18 degrees Celsius (° C.) and 22° C. In other implementations, the membrane may be coated onto the anode 1820, such that the ionic conductivity of the membrane is between $3.97 \times 10^{-6}$ siemens per meter (S/m) and $4.03 \times 10^{-6}$ S/m at a temperature between 18 degrees Celsius (° C.) and 22° C. In some aspects, higher quantities of one or more lithium-containing salts may be associated with an increase in the ionic conductivity of the polymer matrix 1831.

In one implementation, the solid-state electrolyte 1830, when formed as a membrane, has a thickness between 10 micrometers ($\mu m$) and 50 $\mu m$, and may have a uniform density throughout its thickness. For example, in some instances, the solid-state electrolyte 1830 may have a density between 2 grams per cubic centimeter ($g/cm^3$) and 3 $g/cm^3$. In some aspects, the membrane may be coated onto a sacrificial polymer (not shown in FIG. 18 for simplicity), which may be disposed on the anode 1820 facing the solid-state electrolyte 1830. In this way, the solid-state electrolyte 1830 may prevent electrons from traveling from the anode 1820 to the cathode 1810 through the solid-state electrolyte 1830. In addition, contact points between the solid-state electrolyte 1830 and the anode 1820 may prevent impedance growth of the battery 1800.

In one implementation, the cathode 1810 has a thickness between 50 micrometers ($\mu m$) and 150 $\mu m$, and a density between 5 grams per cubic centimeter ($g/cm^3$) and 15 $g/cm^3$. In some aspects, the solid-state electrolyte 2360 may be prepared without a liquid-phase electrolyte, such as Examples 1-20 disclosed herein. In addition, or the alternative, the solid-state electrolyte 1830 may localize lithium-containing polysulfide species within the cathode 1810 and/or prevent growth of lithium-containing dendritic structures from the anode 1820. In some aspects, the anode 1820 may volumetrically expand between 5% and 20% of its initial size during operational discharge-charge cycling of the battery 1800. In some instances, the solid-state electrolyte 1830 may provide interfacial stability between the anode 1820 and the solid-state electrolyte 1830 during operational discharge-charge cycling of the battery 1800, for example, to reduce or limit volumetric expansion of the anode 1820.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

What is claimed is:

1. A system including a fluidized-bed reactor, comprising:
   a gas feed source configured to flow a gas-phase mixture into an interior of the fluidized-bed reactor;
   a gas inlet valve coupled with and in fluid communication with the gas feed source, the gas inlet valve configured to regulate the flow of the gas-phase mixture into the interior of the fluidized-bed reactor;
   a gas-solid separator positioned upstream of the gas inlet valve within the fluidized-bed reactor;
   an energy source configured to generate a plasma-phase mixture responsive to electromagnetic excitation of the gas-phase mixture, the plasma-phase mixture formed in a plasma region adjacent to or within the interior of the fluidized-bed reactor;
   a pressure control assembly configured to adjust one or more of a pressure or a velocity of at least some of a plurality of carbon nano-particulates within the interior of the fluidized-bed reactor; and
   an energy management apparatus external to the fluidized-bed reactor, the energy management apparatus configured to control energetic excitement of the gas-phase mixture.

2. The system of claim 1, wherein the fluidized-bed reactor is formed as an elongated tube including an outlet configured to output the gas-phase mixture and one or more gases produced in conjunction with generating the plasma-phase mixture.

3. The system of claim 1, wherein the energy source comprises a microwave coupled plasma torch configured to operate in either a pulsed mode or a continuous mode.

4. The system of claim 3, wherein the microwave coupled plasma torch is configured to operate at a pressure between 1 millitorr (mTorr) and 760 Torr.

5. The system of claim 4, wherein a cross-sectional area of the fluidized-bed reactor is one of a rectangle, a square, a bell, a circle, or an oval.

6. The system of claim 3, wherein the microwave coupled plasma torch is positioned along one or more sides of the fluidized-bed reactor.

7. The system of claim 3, wherein the microwave coupled plasma torch is configured to disperse additional amounts of the plasma-phase mixture into the interior of the fluidized-bed reactor, the additional amounts of the plasma-phase mixture configured to energetically excite one or more of the gas-phase mixture, the plasma-phase mixture, or the plurality of carbon nano-particulates.

8. The system of claim 1, wherein the gas-phase mixture is configured to prevent an escape of the carbon nano-particulates from the fluidized-bed reactor.

9. The system of claim 1, further comprising:
   a side port formed in the fluidized-bed reactor, the side port configured to supply an additional gas-phase mixture into the fluidized-bed reactor.

10. The system of claim 1, wherein the energy source is external to the fluidized-bed reactor.

11. The system of claim 1, wherein the fluidized-bed reactor is configured to modify a crystal structure of at least some of the carbon nano-particulates.

12. The system of claim 1, wherein the fluidized-bed reactor is configured to chemically alter one or more exposed surfaces of at least some of the carbon nano-particulates.

13. The system of claim 1, wherein the energy source is configured to generate the plasma-phase mixture in either a thermal equilibrium state or a non-thermal equilibrium state in response to a control signal.

14. The system of claim 13, wherein the thermal equilibrium state is configured to control a plurality of energetic properties associated with one or more of the plasma-phase mixture or the gas-phase mixture.

15. The system of claim 14, wherein the plurality of energetic properties includes an energy transfer rate between the plasma-phase mixture and the gas-phase mixture.

16. The system of claim 1, wherein the fluidized-bed reactor is configured to homogenize at least some of the plurality of carbon nano-particulates in the powder.

17. The system of claim 1, wherein the fluidized-bed reactor is configured to control a residence time of a matching network associated with the energy management apparatus.

18. The system of claim 1, wherein the plurality of carbon nano-particulates includes one or more non-hollow carbon spherical (NHCS) particles.

19. The system of claim 1, further comprising:
a powder pre-loaded into the interior of the fluidized-bed reactor, the powder including a plurality of carbon nano-particulates configured to be fluidized above the gas-solid separator responsive to the flow of the gas-phase mixture into the interior of the fluidized-bed reactor.

20. The system of claim 1, wherein the energy management apparatus includes a matching network coupled to the energy source.

* * * * *